(12) United States Patent
Xu et al.

(10) Patent No.: US 8,583,101 B1
(45) Date of Patent: Nov. 12, 2013

(54) METHOD AND APPARATUS FOR SYNCHRONIZING HEARTBEAT BEHAVIOR

(71) Applicant: Huawei Device Co., Ltd., Shenzhen (CN)

(72) Inventors: Wei Xu, Shenzhen (CN); Konggang Wei, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 13/676,948

(22) Filed: Nov. 14, 2012

Related U.S. Application Data

(63) Continuation of application No. PCT/CN2012/076675, filed on Jun. 8, 2012.

(51) Int. Cl.
*H04B 1/16* (2006.01)
*H04W 4/00* (2009.01)
*H04W 24/00* (2009.01)

(52) U.S. Cl.
USPC ............... 455/422.1; 455/343.4; 455/433; 455/456.1; 455/502; 370/350

(58) Field of Classification Search
USPC ......... 455/343.2, 343.4, 404.2, 432.1, 433, 455/456.1–456.6, 458, 461, 502, 515, 455/432.3, 422.1; 370/311, 324, 350
See application file for complete search history.

(56) References Cited

U.S. PATENT DOCUMENTS

| | | | | |
|---|---|---|---|---|
| 8,095,152 B2* | 1/2012 | Sheha et al. | ............... | 455/456.1 |
| 8,316,098 B2* | 11/2012 | Luna et al. | .................. | 709/216 |
| 2003/0036389 A1* | 2/2003 | Yen | .................. | 455/456 |
| 2003/0114168 A1* | 6/2003 | Shi et al. | .................. | 455/456 |
| 2005/0003831 A1* | 1/2005 | Anderson | .................. | 455/456.1 |
| 2007/0030841 A1* | 2/2007 | Lee et al. | .................. | 370/352 |
| 2008/0304434 A1* | 12/2008 | Giaretta et al. | .................. | 370/313 |
| 2008/0305792 A1* | 12/2008 | Khetawat et al. | .................. | 455/435.1 |
| 2009/0312033 A1* | 12/2009 | Shen et al. | .................. | 455/456.1 |
| 2010/0019887 A1* | 1/2010 | Bridgelall et al. | .................. | 340/10.2 |
| 2010/0279676 A1* | 11/2010 | Benn et al. | .................. | 455/419 |
| 2010/0325194 A1* | 12/2010 | Williamson et al. | .................. | 709/203 |
| 2011/0170464 A1* | 7/2011 | Sengottaiyan et al. | .................. | 370/311 |

(Continued)

FOREIGN PATENT DOCUMENTS

| | | |
|---|---|---|
| CN | 101557405 A | 10/2009 |
| CN | 101883350 A | 11/2010 |
| CN | 102201907 A | 9/2011 |
| CN | 102404858 A | 4/2012 |

OTHER PUBLICATIONS

Written Opinion of the International Searching Authority issued in corresponding PCT Patent Application No. PCT/CN2012/076675, mailed Mar. 14, 2013.

(Continued)

*Primary Examiner* — Simon Nguyen

(74) *Attorney, Agent, or Firm* — Brinks Gilson & Lione

(57) ABSTRACT

The present invention provides a method and an apparatus for synchronizing heartbeat behavior. The method includes: acquiring a period list and a time list; acquiring a period length of the heartbeat behavior according to the period list; acquiring synchronization time according to the time list, a heartbeat period, and a preset multiple; and synchronizing at least one type of heartbeat behavior by using the period length of the heartbeat behavior as a period from the synchronization time.

26 Claims, 7 Drawing Sheets

(56) References Cited

U.S. PATENT DOCUMENTS

| | | | |
|---|---|---|---|
| 2011/0201343 A1* | 8/2011 | Pinheiro et al. | 455/450 |
| 2011/0281574 A1* | 11/2011 | Patel et al. | 455/422.1 |
| 2012/0058764 A1* | 3/2012 | Kang et al. | 455/435.1 |
| 2012/0069786 A1* | 3/2012 | Wiatrowski et al. | 370/315 |
| 2012/0077525 A1* | 3/2012 | Collins et al. | 455/458 |
| 2012/0106423 A1* | 5/2012 | Nylander et al. | 370/311 |
| 2012/0250599 A1* | 10/2012 | Henttonen et al. | 370/311 |
| 2013/0039339 A1* | 2/2013 | Rayavarapu et al. | 370/331 |

OTHER PUBLICATIONS

International Search Report issued in corresponding PCT Patent Application No. PCT/CN2012/076675, mailed Mar. 14, 2013.

* cited by examiner

METHOD AND APPARATUS FOR SYNCHRONIZING HEARTBEAT BEHAVIOR

CROSS-REFERENCE TO RELATED APPLICATIONS

This application is a continuation of International Application No. PCT/CN2012/076675, filed on Jun. 8, 2012, which is hereby incorporated by reference in its entirety.

FIELD OF THE INVENTION

The present invention relates to communications technologies, and in particular to a method and an apparatus for synchronizing heartbeat behavior.

BACKGROUND OF THE INVENTION

A heartbeat of a mobile phone enables the mobile phone to switch from a hibernation state to a wake-up state. Heartbeat behavior of the mobile phone is a behavior of exchanging and updating data between the mobile phone and a network side without any user's operation after the mobile phone switches from the hibernation state to the wake-up state. Currently, when the mobile phone is in a standby state, it mainly has the following types of heartbeat behavior:

First type: The mobile phone proactively initiates a location area update to a base station and periodically updates the location area according to a time length delivered by the based station when the mobile phone is in a deep standby state.

Second type: The mobile phone proactively initiates a routing area update to a base station and periodically updates the routing area according to a time length delivered by the based station when the mobile phone is in a deep standby state.

Third type: The mobile phone regularly accesses a broadcast control channel (Broadcast Control Channel, BCCH in short) of a cell to acquire information about the cell.

Fourth type: The mobile phone performs circuit switched paging.

There may be a situation in which at least one type of heartbeat behavior is asynchronous in an actual network. For example, a periodic location area update and a periodic routing area update are not performed synchronously; different cells are added into a neighboring cell list that is set by the mobile phone at different time, so accessing the BCCHs of all cells is asynchronous. Therefore, the mobile phone needs to perform the heartbeat behavior separately in the standby state, which causes repeated link establishments and link disconnections and a waste of power by the mobile phone.

SUMMARY OF THE INVENTION

The present invention provides a method and an apparatus for synchronizing heartbeat behavior to solve the problem of a waste of power by a mobile phone.

A first aspect of the present invention provides a method for synchronizing heartbeat behavior, including:
  acquiring a period list and a time list;
  acquiring a period length of the heartbeat behavior according to the period list, and acquiring synchronization time according to the time list, a heartbeat period, and a preset multiple; and
  synchronizing at least one type of heartbeat behavior by using the period length of the heartbeat behavior as a period from the synchronization time.

A second aspect of the present invention provides an apparatus for synchronizing heartbeat behavior, including:
  a list acquiring module, configured to acquire a period list and a time list; a period length acquiring module, configured to acquire a period length of the heartbeat behavior according to the period list acquired by the list acquiring module;
  a synchronization time acquiring module, configured to acquire synchronization time according to the time list acquired by the list acquiring module, a heartbeat period, and a preset multiple; and
  a synchronization module, configured to synchronize at least one type of heartbeat behavior by using the period length of the heartbeat behavior acquired by the period length acquiring module as a period from the synchronization time acquired by the synchronization time acquiring module.

A third aspect of the present invention provides an apparatus, including a memory that stores an instruction, where according to the instruction, a processor implements a method for synchronizing the foregoing heartbeat behavior.

A fourth aspect of the present invention provides an apparatus, including a processor, where the processor is configured to implement a method for synchronizing the foregoing heartbeat behavior.

A fifth aspect of the present invention provides a computer program product, where the computer program product includes computer program codes, and when the computer program codes are run on a computer, the computer program codes can enable the computer to perform steps of a method for synchronizing the foregoing heartbeat behavior.

A sixth aspect of the present invention provides a computer readable storage medium, where the computer readable storage medium stores computer program codes, and when the computer program codes are run on a computer, the computer program codes can enable the computer to perform steps of the foregoing methods for synchronizing heartbeat behavior.

Technical effects of the present invention are: acquiring a period length of heartbeat behavior according to an acquired period list, acquiring synchronization time according to an acquired time list, a heartbeat period, and a preset multiple, and synchronizing at least one type of heartbeat behavior by using this period length of the heartbeat behavior as a period from the synchronization time, therefore solving the problem of a waste of power caused by too much heartbeat behavior due to the assynchronization of at least one type of heartbeat behavior in the prior art, and further significantly reducing power consumption caused by too much heartbeat behavior.

DETAILED DESCRIPTION OF THE EMBODIMENTS

Figure 1:
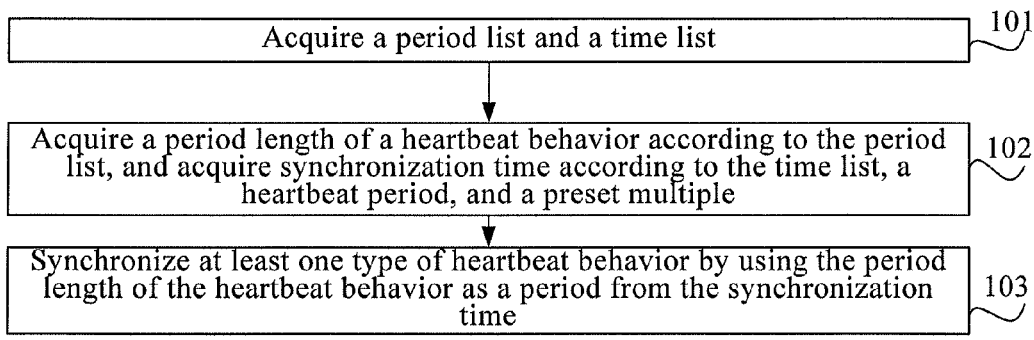
FIG. 1 is a flow chart of a method for synchronizing heartbeat behavior according to a first embodiment of the present invention.

FIG. 1 is a flow chart of a method for synchronizing heartbeat behavior according to a first embodiment of the present invention. As shown in FIG. 1, the implementation subject in this embodiment is an apparatus for synchronizing the heartbeat behavior. This method includes:

Step 101: Acquire a period list and a time list.

Step 102: Acquire a period length of the heartbeat behavior according to the period list, and acquire synchronization time according to the time list, a heartbeat period, and a preset multiple.

Step 103: Synchronize at least one type of heartbeat behavior by using the period length of the heartbeat behavior as a period from the synchronization time.

According to this embodiment, the following one or more types of heartbeat behavior may be included: a location area update, a routing area update, access to a BCCH of a cell, and circuit switched paging; where the circuit switched paging may also be called discontinuous reception (Discontinuous Reception, DRX for short) interception.

In addition, in this embodiment, take a mobile phone as an apparatus for synchronizing the heartbeat behavior as an example. The location area update means that: when the mobile phone registers on a network, it selects a proper circuit switched location area for residence, and proactively and periodically initiates the location area update to a base station when the mobile phone is in a standby state; therefore the network can clearly learn the location of the mobile phone, and the mobile phone can respond the paging from the network in time.

The routing area update means that: when the mobile phone registers on the network, it selects a proper packet switched routing area, and proactively and periodically initiates the routing area update to the base station; therefore the mobile phone can initiate a data service to the base station.

The circuit switched paging means that: a base station side delivers a paging instruction to the mobile phone through a paging channel, and the mobile phone determines whether paging information that matches the mobile phone is received on the paging channel by periodically intercepting this paging channel that corresponds to the mobile phone. In addition, a plurality of mobile phones may be connected to the base station through one paging channel. That is, the paging information corresponding to one mobile phone or a plurality of mobile phones may be included on one paging channel.

According to this embodiment, the period length of the heartbeat behavior is acquired according to the acquired period list; the synchronization time is acquired according to the acquired time list, the heartbeat period, and the preset multiple; and at least one type of heartbeat behavior is synchronized by using the period length of the heartbeat behavior as the period from the synchronization time. Therefore, the following problem in the prior art is solved: a waste of power of the apparatus for synchronizing the heartbeat behavior is caused by the assynchronization of at least one type of heartbeat behavior, and further power consumption of the apparatus for synchronizing the heartbeat behavior is effectively reduced.

Preferably, on the basis of the embodiment illustrated in FIG. 1, synchronizing at least one type of heartbeat behavior, as described in step 103, may include the following specific implementation methods:

First, synchronously access the BCCHs of all cells in a neighboring cell list;

Second: synchronously perform the location area update and the routing area update;

Third: synchronously perform the location area update and access the BCCHs of all cells in the neighboring cell list;

Fourth: synchronously perform the routing area update and access the BCCHs of all cells in the neighboring cell list;

Fifth: synchronously perform the location area update and the routing area update, and access the BCCHs of all cells in the neighboring cell list;

Sixth: synchronously access the BCCHs of all cells in the neighboring cell list and perform the circuit switched paging;

Seventh: synchronously perform the location area update and the circuit switched paging;

Eighth: synchronously perform the routing area update and the circuit switched paging;

Ninth: synchronously perform the location area update, access the BCCHs of all cells in the neighboring cell list, and perform the circuit switched paging;

Tenth: synchronously perform the routing area update, access the BCCHs of all cells in the neighboring cell list, and perform the circuit switched paging;

Eleventh: synchronously perform the location area update, the routing area update, and the circuit switched paging; and Twelfth: synchronously perform the location area update, the routing area update, and the circuit switched paging, and access the BCCHs of all cells in the neighboring cell list.

Figure 2:
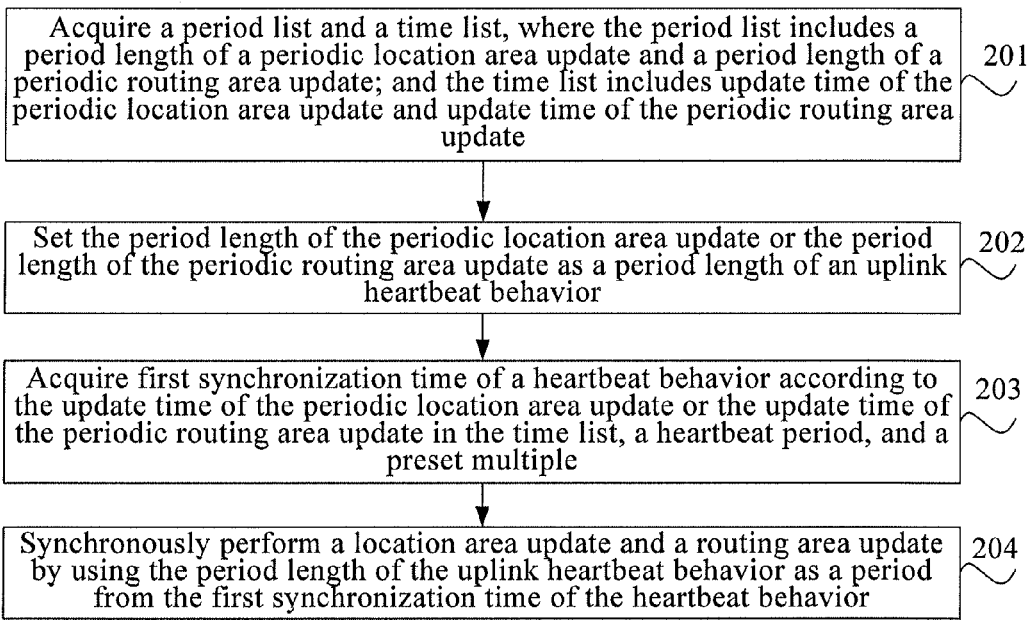
FIG. 2 is a flow chart of a method for synchronizing heartbeat behavior according to a second embodiment of the present invention.

FIG. 2 is a flow chart of a method for synchronizing heartbeat behavior according to a second embodiment of the present invention. According to this embodiment, a period list including a period length of a periodic location area update and a period length of a periodic routing area update and a time list including the time of the periodic location area update and the time of the periodic routing area update are used as examples to describe technical solutions in detail in this embodiment. As shown in FIG. 2, the implementation subject in this embodiment is an apparatus for synchronizing the heartbeat behavior. This method includes:

Step 201: Acquire the period list and the time list, where the period list includes the period length of the periodic location area update and the period length of the periodic routing area update; and the time list includes the update time of the periodic location area update and the update time of the periodic routing area update.

According to this embodiment, a specific implementation method for acquiring the period list and the time list is as follows:

separately collect the period length and the update time of the location area update and the routing area update performed by a mobile phone in the prior art. Specifically, collect the period length and the update time of the periodic location area update and the period length and the update time of the periodic routing area update, record the collected period length of the periodic location area update and the collected period length of the periodic routing area update into the period list, and record the collected update time of the periodic location area update and the collected update time of the periodic routing area update into the time list.

Step 202: Set the period length of the periodic location area update or the period length of the periodic routing area update as a period length of uplink heartbeat behavior.

According to this embodiment, preferably, the specific implementation method described in step 202 may be as follows:

when a voice service has a higher priority than a data service, set the period length of the periodic location area update as the period length of the uplink heartbeat behavior; and when the data service has a higher priority than the voice service, set the period length of the periodic routing area update as the period length of the uplink heartbeat behavior.

Specifically, mainly on a circuit switched domain where the voice service has a higher priority than the data service, the period length of the periodic location area update is set as the period length of the uplink heartbeat behavior to ensure that the voice service is initiated properly. Or, mainly on a packet switched domain where the data service has a higher priority than the voice service, the period length of the periodic routing area update is set as the period length of the uplink heartbeat behavior to ensure that the data service is initiated properly.

In addition, the location area update and the routing area update are uplink heartbeat behavior, so in this embodiment, only the period length of the uplink heartbeat behavior is considered in terms of the location area update and the routing area update, where an uplink is a direction from the apparatus for synchronizing the heartbeat behavior to a base station.

Step 203: Acquire first synchronization time of the heartbeat behavior according to the update time of the periodic location area update or the update time of the periodic routing area update in the time list, a heartbeat period, and a preset multiple.

According to this embodiment, the preset multiple may be preset according to network environment, where the network environment may be information about signal strength, signal-to-noise ratio, and the like. For example, the stronger a signal is, the greater the preset multiple is.

In addition, the heartbeat period may be set by using a timer on the apparatus for synchronizing the heartbeat behavior, and triggering time of the heartbeat, that is a wake-up time of the apparatus for synchronizing the heartbeat behavior, may also be set by using the timer, where the heartbeat period is a time length between one triggering time of a heartbeat and the next triggering time of the heartbeat.

Step 204: Synchronously perform the location area update and the routing area update by using the period length of the uplink heartbeat behavior as the period from the first synchronization time of the heartbeat behavior.

According to this embodiment, first the period length of the periodic location area update or the period length of the periodic routing area update in the acquired period list is set as the period length of the uplink heartbeat behavior; then the first synchronization time of the heartbeat behavior is acquired according to the acquired time list, the heartbeat period, and the preset multiple; finally the location area update and the routing area update are performed synchronously by using the period length of the uplink heartbeat behavior as the period from the first synchronization time of the heartbeat behavior. In this way, the problem of asynchronization between the location area update and the routing area update in the prior art is solved, and further power consumption of the apparatus for synchronizing the heartbeat behavior is effectively reduced.

Further, according to a third embodiment of a method for synchronizing heartbeat behavior in the present invention, on the basis of the embodiment illustrated in FIG. 2, for the purpose of further reducing the power consumption of the apparatus for synchronizing the heartbeat behavior, the period list includes a DRX interception period length, the time list includes DRX interception time, and this method further includes:

setting the DRX interception period length as the heartbeat period, and setting the DRX interception time as the triggering time of the heartbeat, where the heartbeat period is equal to the DRX interception period length; the heartbeat triggering time is equal to the DRX interception time; and the heartbeat period is the time length between the triggering time of the heartbeat and the next triggering time of the heartbeat.

In addition, it should be noted that in each embodiment of the present invention, the synchronization time coincides with the triggering time of the heartbeat at a first time, and after the first time, the synchronization time coincides with the heartbeat time at an interval of the period length of the heartbeat behavior.

According to this embodiment, the DRX interception period length and the DRX interception time are constant, therefore, the DRX interception period length and the DRX interception time can be used as the heartbeat period and the triggering time of the heartbeat, respectively. In addition, specifically, the DRX interception period length and the DRX interception time are collected, the DRX interception period length is recorded into the period list, and the DRX interception time is recorded into the time list, where the DRX interception period length is a period length for performing circuit switched paging, and the DRX interception time is an initial time of the circuit switched paging. It should be noted that the DRX interception period length and the DRX interception time are acquired by negotiating with the base station during registration of the mobile phone and are stored in the mobile phone.

Further, according to a fourth embodiment of a method for synchronizing heartbeat behavior in the present invention, on the basis of the second embodiment or the third embodiment, two specific implementation methods described in step 203 are as follows:

First, when the update time of the routing area update is later than the update time of the location area update, according to the update time TKR of the periodic routing area update in the time list, the heartbeat period $T^{basic}$, and the preset multiple K, use the formula (1)=

$$T_1^{start}=TKR+K*T^{basic} \qquad (1)$$

to acquire the first synchronization time $T_1^{basic}$ of the heartbeat behavior.

Second, when the update time of the location area update is later than the update time of the routing area update, according to the update time TKL of the periodic location area update in the time list, the heartbeat period $T^{basic}$, and the preset multiple K, use the formula (2)

$$T_1^{start}=TKL+K*T^{basic} \qquad (2)$$

to acquire the first synchronization time $T_1^{start}$ of the heartbeat behavior; where:

K is an integer and is greater than or equal to 1.

Preferably, for the purpose of further reducing the power consumption of the apparatus for synchronizing the heartbeat behavior, the period list further includes the period length for accessing a BCCH of each cell in a neighboring cell list, the time list further includes update time for accessing the BCCH of each cell in the neighboring cell list, and this method further includes:

setting a period length of downlink heartbeat behavior according to the period list, the preset multiple, and the period length of the uplink heartbeat behavior;

querying the update time for accessing the BCCH of each cell in the neighboring cell list in the time list; acquiring the update time TKn for accessing the BCCH of the cell that is last added into the neighboring cell list; according to the update time TKn for accessing the BCCH of the cell that is last added into the neighboring cell list, the heartbeat period $T^{basic}$, and the preset multiple K, using formula (3)

$$T_2^{start} = TKn + K*T^{basic} \qquad (3)$$

to acquire second synchronization time $T_2^{start}$ of the heartbeat behavior; and accessing the BCCHs of all cells in the neighboring cell list by using the period length of the downlink heartbeat behavior as a period from the second synchronization time of the heartbeat behavior; where:

K is an integer and is greater than or equal to 1.

In addition, according to the period list, the preset multiple, and the period length of the uplink heartbeat behavior, the implementation method for setting the period length of the downlink heartbeat behavior may be specifically as follows:

according to the period length for accessing the BCCH of each cell in the neighboring cell list in the period list and the preset multiple K, use the formula (4)

$$TD = K*\max(T1, \ldots, Tn) \qquad (4)$$

to acquire a first period length TD;

when the period length of the uplink heartbeat behavior is greater than or equal to the first period length, set the first period length as the period length of the downlink heartbeat behavior; and when the period length of the uplink heartbeat behavior is less than the first period length, set the period length of the uplink heartbeat behavior as the period length of the downlink heartbeat behavior; where:

T1 indicates a period length for accessing a BCCH of a 1st cell; Tn indicates a period length for accessing a BCCH of an nth cell; and n is an integer and is greater than or equal to 1.

It should be noted that accessing the BCCH of the cell is downlink heartbeat behavior, so in this embodiment, only the period length of the downlink heartbeat behavior is considered in terms of accessing the BCCH of the cell, where a downlink is a direction from the base station to the apparatus for synchronizing the heartbeat behavior.

More preferably, to further reduce the power consumption of the apparatus for synchronizing the heartbeat behavior, this method may further include:

synchronously performing the location area update and the routing area update, and accessing the BCCHs of all cells in the neighboring cell list by using the period length of the second heartbeat behavior as the period from third synchronization time, where the period length of the second heartbeat behavior is m times the period length of the downlink heartbeat behavior, m times the period length of the downlink heartbeat behavior is less than the period length of the uplink heartbeat behavior, m+1 times the period length of the downlink heartbeat behavior is greater than the period length of the uplink heartbeat behavior, and m is an integer and is greater than or equal to 1.

It should be noted that when the first synchronization time is later than the second synchronization time, the third synchronization time is the first synchronization time; and when the second synchronization time is later than the first synchronization time, the third synchronization time is the second synchronization time.

According to this embodiment, the update time and the heartbeat period for respectively performing the location area update and the routing area update, and accessing the BCCHs of all cells in the neighboring cell list are synchronized to implement only one link establishment behavior and one link disconnection behavior for completing the three types of heartbeat behavior, and further the power consumption of the apparatus for synchronizing the heartbeat behavior is effectively reduced.

Figure 3:
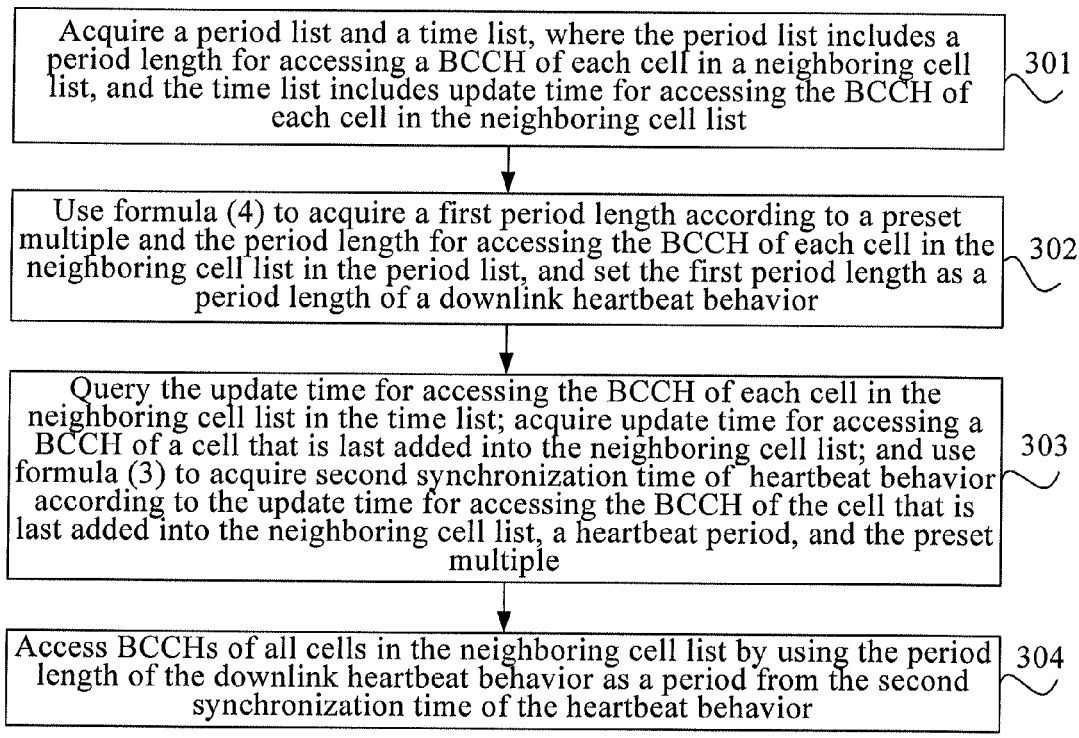
FIG. 3 is a flow chart of a method for synchronizing heartbeat behavior according to a fifth embodiment of the present invention.

FIG. 3 is a flow chart of a method for synchronizing heartbeat behavior according to a fifth embodiment of the present invention. According to this embodiment, a period list including a period length of accessing a BCCH of each cell in a neighboring cell list and a time list including update time for accessing the BCCH of each cell in the neighboring cell list are used as examples to describe technical solutions in detail in this embodiment. As shown in FIG. 3, the implementation subject in this embodiment is an apparatus for synchronizing the heartbeat behavior. This method includes:

Step 301: Acquire the period list and the time list, where the period list includes the period length for accessing the BCCH of each cell in the neighboring cell list, and the time list includes the update time for accessing the BCCH of each cell in the neighboring cell list.

Step 302: According to a preset multiple K and the period length for accessing the BCCH of each cell in the neighboring cell list in the period list, use the formula (4)

$$TD = K*\max(T1, \ldots, Tn) \qquad (4)$$

to acquire a first period length TD, and set the first period length TD as a period length of downlink heartbeat behavior.

Step 303: Query the update time for accessing the BCCH of each cell in the neighboring cell list in the time list; acquire the update time TKn for accessing the BCCH of the cell that is last added into the neighboring cell list; and according to the update time TKn for accessing the BCCH of the cell that is last added into the neighboring cell list, a heartbeat period $T^{basic}$, and the preset multiple K, use the formula (3)

$$T_2^{start} = TKn + K*T^{basic} \qquad (3)$$

to acquire second synchronization time $T_2^{start}$ of the heartbeat behavior. K is an integer and is greater than or equal to 1.

According to this embodiment, the heartbeat period may be set by using a timer on the apparatus for synchronizing the heartbeat behavior, and triggering time of the heartbeat, that is a wake-up time of the apparatus for synchronizing the heartbeat behavior, may also be set by using the timer, where the heartbeat period is a time length between one triggering time of a heartbeat and the next triggering time of the heartbeat.

Step 304: Access the BCCHs of all cells in the neighboring cell list by using the period length of the downlink heartbeat behavior as a period from the second synchronization time of the heartbeat behavior.

According to this embodiment, first the period length of the downlink heartbeat behavior is acquired according to the preset multiple and the period length for accessing the BCCH of each cell in the neighboring cell list in the period list; then the second synchronization time of the heartbeat behavior is acquired according to the update time for accessing the BCCH of each cell in the neighboring cell list in the time list, the heartbeat period, and the preset multiple; finally the BCCHs of all cells in the neighboring cell list are accessed by using the period length of the downlink heartbeat behavior as the period from the second synchronization time of the heartbeat behavior. In this way, the problem of synchronously accessing the BCCH of each cell in the neighboring cell list in the prior art is solved, and further power consumption of the apparatus for synchronizing the heartbeat behavior is effectively reduced.

Further, according to a sixth embodiment of a method for synchronizing heartbeat behavior in the present invention, on the basis of the embodiment illustrated in FIG. 3, for the purpose of further reducing the power consumption of the apparatus for synchronizing the heartbeat behavior, the period list includes a DRX interception period length, the time list includes DRX interception time, and this method further includes:

setting the DRX interception period length as the heartbeat period, and setting the DRX interception time as the triggering time of the heartbeat.

According to this embodiment, the DRX interception period length and the DRX interception time are constant, therefore, the DRX interception period length and the DRX interception time can be used as the heartbeat period and the triggering time of the heartbeat, respectively. In addition, specifically, the DRX interception period length and the DRX interception time are collected, the DRX interception period length is recorded into the period list, and the DRX interception time is recorded into the time list, where the DRX interception period length is a period length for performing circuit switched paging, and the DRX interception time is an initial time of the circuit switched paging. It should be noted that the DRX interception period length and the DRX interception time are acquired by negotiating with a base station during registration of a mobile phone and are stored in the mobile phone.

Further, according to a seventh embodiment of a method for synchronizing heartbeat behavior in the present invention, on the basis of the fifth embodiment or the sixth embodiment, for the purpose of further reducing the power consumption of the apparatus for synchronizing the heartbeat behavior, the period list includes a period length of a periodic location area update and a period length of a periodic routing area update, the time list includes update time of the periodic location area update and update time of the periodic routing area update, and this method further includes:

setting the period length of the periodic location area update or the period length of the periodic routing area update as a period length of uplink heartbeat behavior;

acquiring first synchronization time of the heartbeat behavior according to the update time of the periodic location area update and the update time of the periodic routing area update in the time list, the heartbeat period, and the preset multiple; and synchronously performing a location area update and a routing area update by using the period length of the uplink heartbeat behavior as the period from the first synchronization time of the heartbeat behavior.

According to this embodiment, in the case where synchronization for accessing BCCHs of all cells is implemented, if synchronization between the location area update and the routing area update is further implemented, the power consumption of the apparatus for synchronizing the heartbeat behavior is more effectively reduced.

Preferably, acquiring the first synchronization time of the heartbeat behavior according to the time list, the heartbeat period and the preset multiple mainly includes the following two specific implementation methods:

when the update time of the routing area update is later than the update time of the location area update, according to the update time TKR of the periodic routing area update in the time list, the heartbeat period $T^{basic}$, and the preset multiple K, use the formula (1)

$$T_1^{start}=TKR+K*T^{basic} \qquad (1)$$

to acquire the first synchronization time $T_1^{start}$ of the heartbeat behavior; and when the update time of the location area update is later than the update time of the routing area update, according to the update time TKL of the periodic location area update in the time list, the heartbeat period $T^{basic}$, and the preset multiple K, use the formula (2)

$$T_1^{start}=TKL+K*T^{basic} \qquad (2)$$

to acquire the first synchronization time $T_1^{start}$ of the heartbeat behavior; where:

K is an integer and is greater than or equal to 1.

More preferably, one specific implementation method in step 302 is as follows:

according to the period length for accessing the BCCH of each cell in the neighboring cell list in the period list and the preset multiple K, use the formula (4)

$$TD=K*\max(T1,\ldots,Tn) \qquad (4)$$

to acquire a first period length TD;

when the period length of the uplink heartbeat behavior is greater than or equal to the first period length, set the first period length TD as the period length of the downlink heartbeat behavior.

In addition, it should be noted that when the period length of the uplink heartbeat behavior is less than the first period length, set the period length of the uplink heartbeat behavior as the period length of the downlink heartbeat behavior.

To further reduce the power consumption of the apparatus for synchronizing the heartbeat behavior, this method may further include:

when the period length of the uplink heartbeat behavior is greater than or equal to the period length of the downlink heartbeat behavior, synchronously performing the location area update and the routing area update, and accessing the BCCHs of all cells in the neighboring cell list by using a period length of second heartbeat behavior as the period from third synchronization time, where the period length of the second heartbeat behavior is m times the period length of the downlink heartbeat behavior, m times the period length of the downlink heartbeat behavior is less than the period length of the uplink heartbeat behavior, m+1 times the period length of the downlink heart beat behavior is greater than the period length of the uplink heartbeat behavior, and m is an integer and is greater than or equal to 1; and when the period length of the uplink heartbeat behavior is less than the period length of the downlink heartbeat behavior, synchronously performing the location area update and the routing area update, and accessing the BCCHs of all cells in the neighboring cell list by using the period length of the uplink heartbeat behavior as the period from the third synchronization time.

It should be noted that when the first synchronization time is later than the second synchronization time, the third synchronization time is the first synchronization time; and when the second synchronization time is later than the first synchronization time, the third synchronization time is the second synchronization time.

Figure 4:
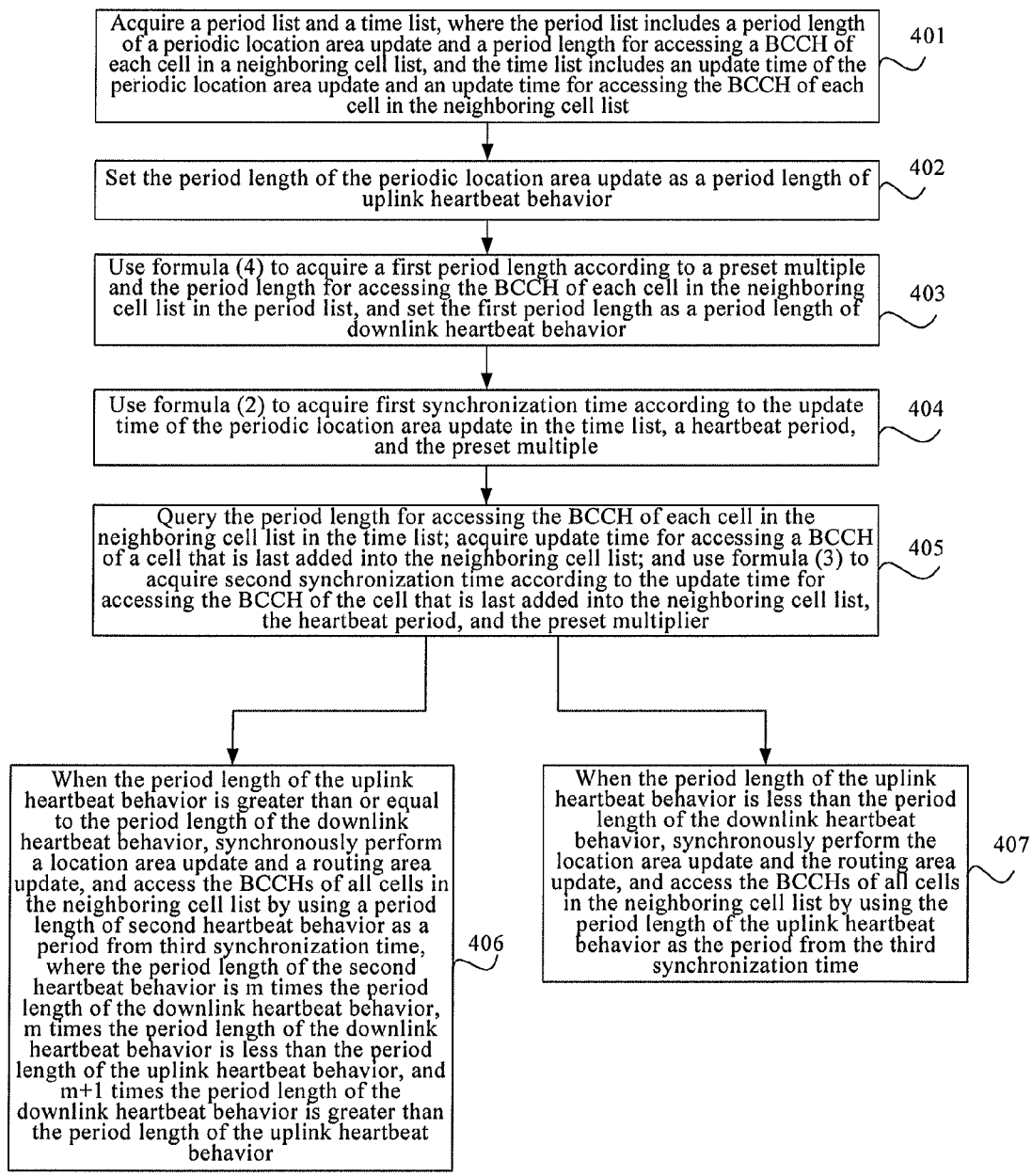
FIG. 4 is a flow chart of a method for synchronizing heartbeat behavior according to an eighth embodiment of the present invention.

FIG. 4 is a flow chart of a method for synchronizing heartbeat behavior according to an eighth embodiment of the present invention. According to this embodiment, a period list including a period length of a periodic location area update and a period length for accessing a BCCH of each cell in a neighboring cell list and a time list including update time of the periodic location area update and update time for accessing the BCCH of each cell in the neighboring cell list are used as examples to describe technical solutions in detail in this embodiment. As shown in FIG. 4, the implementation subject in this embodiment is an apparatus for synchronizing the heartbeat behavior. This method includes:

Step 401: Acquire the period list and the time list, where the period list includes the period length of the periodic location area update and the period length for accessing the BCCH of each cell in the neighboring cell list, and the time list includes the update time of the periodic location area update and the update time for accessing the BCCH of each cell in the neighboring cell list.

Step 402: Set the period length of the periodic location area update as a period length of uplink heartbeat behavior.

Step 403: According to a preset multiple K and the period length for accessing the BCCH of each cell in the neighboring cell list in the period list, use the formula (4)

$$TD = K * \max(T1, \ldots, Tn) \quad (4)$$

to acquire a first period length TD, and set the first period length TD as a period length of downlink heartbeat behavior.

Step 404: According to the update time TKL of the periodic location area update in the time list, a heartbeat period $T^{basic}$, and the preset multiple K, use the formula (2)

$$T_1^{start} = TKL + K * T^{basic} \quad (2)$$

to acquire first synchronization time $T_1^{start}$.

Step 405: Query the update time for accessing the BCCH of each cell in the neighboring cell list in the time list; acquire the update time TKn for accessing the BCCH of the cell that is last added into the neighboring cell list; and according to the update time TKn for accessing the BCCH of the cell that is last added into the neighboring cell list, the heartbeat period $T^{basic}$, and the preset multiple K, use the formula (3)

$$T_2^{start} = TKn + K * T^{basic} \quad (3)$$

to acquire second synchronization time $T_s^{start}$, and then perform step 406 or 407; where:

K is an integer and is greater than or equal to 1.

According to this embodiment, the heartbeat period may be set by using a timer on the apparatus for synchronizing the heartbeat behavior, and triggering time of the heartbeat, which is a wake-up time of the apparatus for synchronizing the heartbeat behavior, may also be set by using the timer, where the heartbeat period is a time length between one triggering time of a heartbeat and the next triggering time of the heartbeat.

Step 406: When the period length of the uplink heartbeat behavior is greater than or equal to the period length of the downlink heartbeat behavior, synchronously perform a location area update and a routing area update, and access the BCCHs of all cells in the neighboring cell list by using a period length of second heartbeat behavior as a period from third synchronization time, where the period length of the second heartbeat behavior is m times the period length of the downlink heartbeat behavior, m times the period length of the downlink heartbeat behavior is less than the period length of the uplink heartbeat behavior, m+1 times the period length of the downlink heartbeat behavior is greater than the period length of the uplink heartbeat behavior, and m is an integer and is greater than or equal to 1. The procedure ends.

Step 407: When the period length of the uplink heartbeat behavior is less than the period length of the downlink heartbeat behavior, synchronously perform the location area update and the routing area update, and access the BCCHs of all cells in the neighboring cell list by using the period length of the uplink heartbeat behavior as a period from the third synchronization time. The procedure ends.

It should be noted that when the first synchronization time is later than the second synchronization time, the third synchronization time is the first synchronization time; and when the second synchronization time is later than the first synchronization time, the third synchronization time is the second synchronization time.

According to this embodiment, first the period length of the periodic location area update is set as the period length of the uplink heartbeat behavior, and the period length of the downlink heartbeat behavior is acquired according to the preset multiple and the period length for accessing the BCCH of each cell in the neighboring cell list in the period list; then the first synchronization time is acquired according to the update time of the periodic location area update in the time list, the heartbeat period, and the preset multiple, and the second synchronization time is acquired according to the update time for accessing the BCCH of each cell in the neighboring cell in the time list, the heartbeat period, and the preset multiple; finally accessing the BCCHs of all cells in the neighboring cell list and the location area update are synchronously performed by using the period length of the second heartbeat behavior or the period length of the uplink heartbeat behavior as the period from the first synchronization time or the second synchronization time. In this way, power consumption of the apparatus for synchronizing the heartbeat behavior is effectively reduced.

Further, according to a ninth embodiment of a method for synchronizing heartbeat behavior in the present invention, on the basis of the embodiment illustrated in FIG. 4, for the purpose of further reducing the power consumption of the apparatus for synchronizing the heartbeat behavior, the period list includes a DRX interception period length, the time list includes DRX interception time, and this method further includes:

setting the DRX interception period length as the heartbeat period, and setting the DRX interception time as the triggering time of the heartbeat.

According to this embodiment, the DRX interception period length and the DRX interception time are constant, therefore, the DRX interception period length and the DRX interception time can be used as the heartbeat period and the triggering time of the heartbeat, respectively. In addition, specifically, the DRX interception period length and the DRX interception time are collected, the DRX interception period length is recorded into the period list, and the DRX interception time is recorded into the time list, where the DRX interception period length is a period length for performing circuit switched paging, and the DRX interception time is an initial time of the circuit switched paging. It should be noted that the DRX interception period length and the DRX interception time are acquired by negotiating with a base station during registration of a mobile phone and are stored in the mobile phone.

Figure 5:
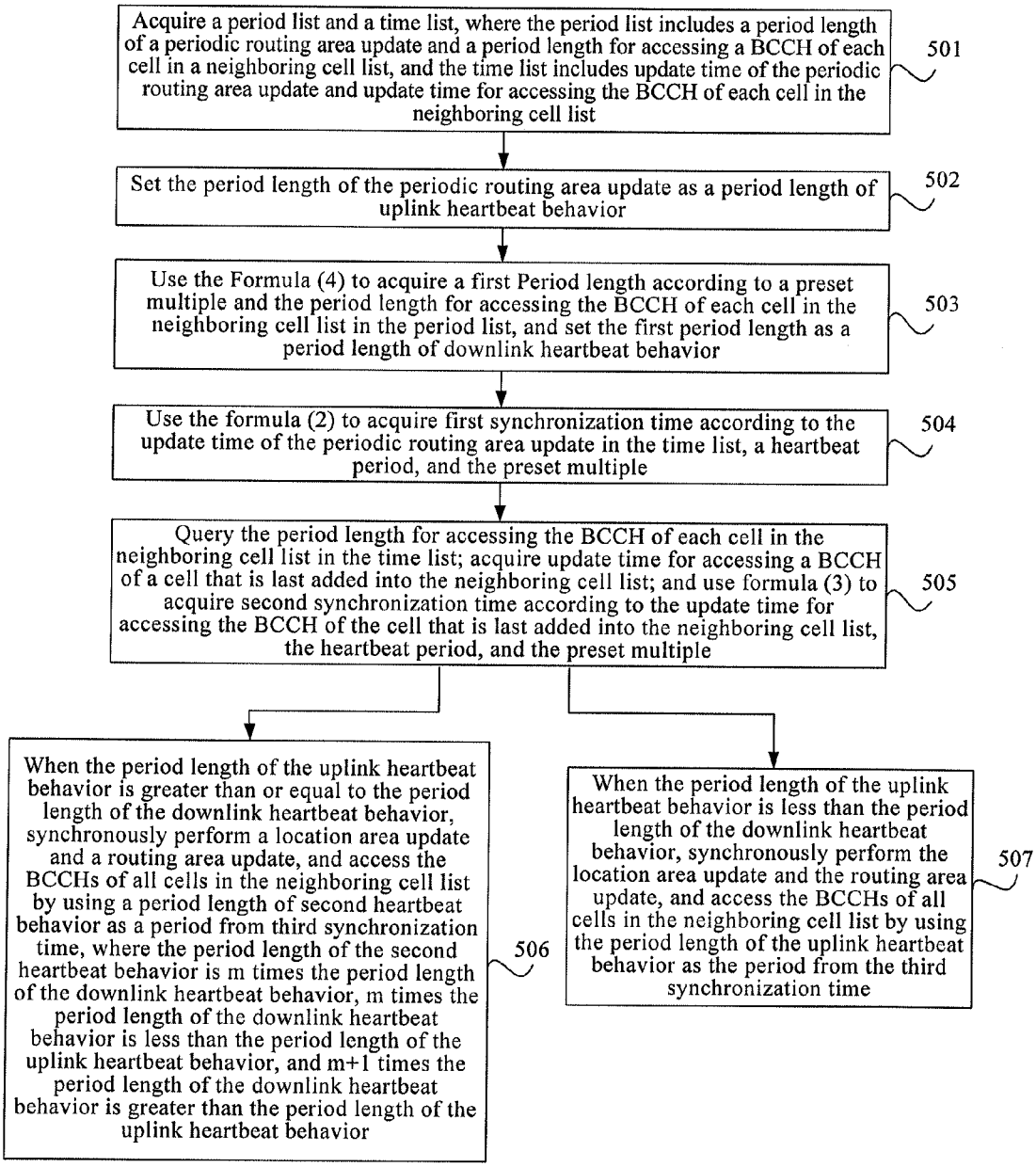
FIG. 5 is a flow chart of a method for synchronizing heartbeat behavior according to a tenth embodiment of the present invention.

FIG. 5 is a flow chart of a method for synchronizing heartbeat behavior according to a tenth embodiment of the present invention. According to this embodiment, a period list including a period length of a periodic routing area update and a period length for accessing a BCCH of each cell in a neighboring cell list and a time list including update time of the periodic routing area update and update time for accessing the BCCH of each cell in the neighboring cell list are used as examples to describe technical solutions in detail in this embodiment. As shown in FIG. 5, the implementation subject in this embodiment is an apparatus for synchronizing the heartbeat behavior. This method includes:

Step 501: Acquire the period list and the time list, where the period list includes the period length of the periodic routing area update and the period length for accessing the BCCH of each cell in the neighboring cell list, and the time list includes the update time of the periodic routing area update and the update time for accessing the BCCH of each cell in the neighboring cell list.

Step 502: Set the period length of the periodic routing area update as a period length of uplink heartbeat behavior.

Step 503: According to a preset multiple K and the period length for accessing the BCCH of each cell in the neighboring cell list in the period list, use the formula (4)

$$TD=K*\max(T1,\ldots,Tn) \quad (4)$$

to acquire a first period length TD, and set the first period length TD as a period length of downlink heartbeat behavior.

Step 504: According to the update time TKR of the periodic routing area update in the time list, a heartbeat period $T^{basic}$, and the preset multiple K, use the formula (2)

$$T_1^{start}=TKR+K*T^{basic} \quad (2)$$

to acquire first synchronization time $T_1^{start}$.

Step 505: Query the update time for accessing the BCCH of each cell in the neighboring cell list in the time list; acquire the update time TKn for accessing the BCCH of the cell that is last added into the neighboring cell list; and according to the update time TKn for accessing the BCCH of the cell that is last added into the neighboring cell list, the heartbeat period $T^{basic}$, and the preset multiple K, use the formula (3)

$$T_2^{start}=TKn+K*T^{basic} \quad (3)$$

to acquire second synchronization time $T_2^{start}$; and then perform step 506 or 507; where:

K is an integer and is greater than or equal to 1.

According to this embodiment, the heartbeat period may be set by using a timer on the apparatus for synchronizing the heartbeat behavior, and triggering time of the heartbeat, that is a wake-up time of the apparatus for synchronizing the heartbeat behavior, may also be set by using the timer, where the heartbeat period is a time length between one triggering time of a heartbeat and the next triggering time of the heartbeat.

Step 506: When the period length of the uplink heartbeat behavior is greater than or equal to the period length of the downlink heartbeat behavior, synchronously perform a location area update and a routing area update, and access the BCCHs of all cells in the neighboring cell list by using a period length of second heartbeat behavior as a period from third synchronization time, where the period length of the second heartbeat behavior is m times the period length of the downlink heartbeat behavior, m times the period length of the downlink heartbeat behavior is less than the period length of the uplink heartbeat behavior, m+1 times the period length of the downlink heartbeat behavior is greater than the period length of the uplink heartbeat behavior, and m is an integer and is greater than or equal to 1. The procedure ends.

Step 507: When the period length of the uplink heartbeat behavior is less than the period length of the downlink heartbeat behavior, synchronously perform the location area update and the routing area update, and access the BCCHs of all cells in the neighboring cell list by using the period length of the uplink heartbeat behavior as a period from the third synchronization time. The procedure ends.

It should be noted that when the first synchronization time is later than the second synchronization time, the third synchronization time is the first synchronization time; and when the second synchronization time is later than the first synchronization time, the third synchronization time is the second synchronization time.

According to this embodiment, first the period length of the periodic routing area update is set as the period length of the uplink heartbeat behavior, and the period length of the downlink heartbeat behavior is acquired according to the preset multiple and the period length for accessing the BCCH of each cell in the neighboring cell list in the period list; then the first synchronization time is acquired according to the update time of the periodic routing area update in the time list, the heartbeat period, and the preset multiple, and the second synchronization time is acquired according to the update time for accessing the BCCH of each cell in the neighboring cell in the time list, the heartbeat period, and the preset multiple; finally accessing the BCCHs of all cells in the neighboring cell list and the routing area update are synchronously performed by using the period length of the second heartbeat behavior or the period length of the uplink heartbeat behavior as the period from the first synchronization time or the second synchronization time. In this way, power consumption of the apparatus for synchronizing the heartbeat behavior is effectively reduced.

Further, according to an eleventh embodiment of a method for synchronizing heartbeat behavior in the present invention, on the basis of the embodiment illustrated in FIG. 5, for the purpose of further reducing the power consumption of the apparatus for synchronizing the heartbeat behavior, the period list includes a DRX interception period length, the time list includes DRX interception time, and this method further includes:

setting the DRX interception period length as the heartbeat period, and setting the DRX interception time as the triggering time of the heartbeat.

According to this embodiment, the DRX interception period length and the DRX interception time are constant, therefore, the DRX interception period length and the DRX interception time can be used as the heartbeat period and the triggering time of the heartbeat, respectively. In addition, specifically, the DRX interception period length and the DRX interception time are collected, the DRX interception period length is recorded into the period list, and the DRX interception time is recorded into the time list, where the DRX interception period length is a period length for performing circuit switched paging, and the DRX interception time is an initial time of the circuit switched paging. It should be noted that the DRX interception period length and the DRX interception time are acquired by negotiating with a base station during registration of a mobile phone and are stored in the mobile phone.

Figure 6:
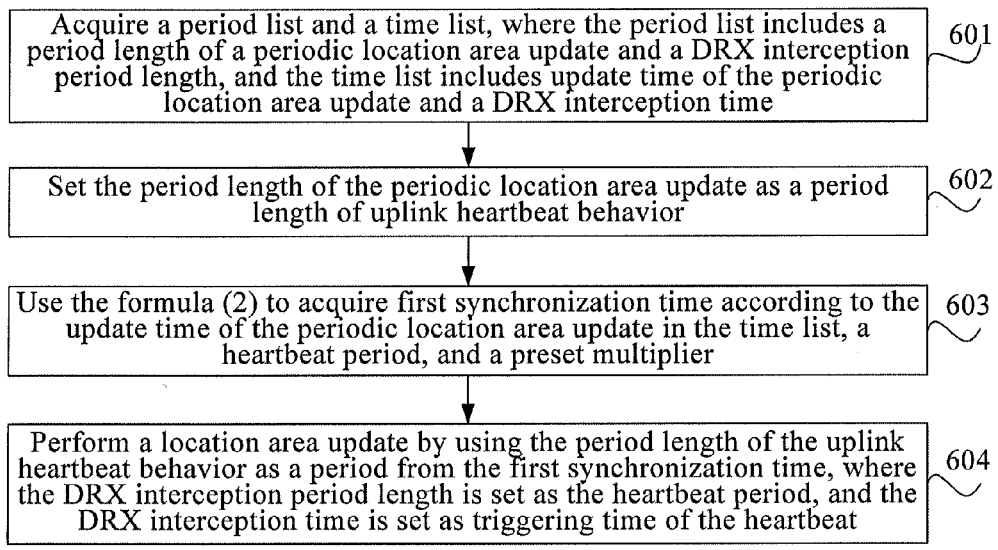
FIG. 6 is a flow chart of a method for synchronizing heartbeat behavior according to a twelfth embodiment of the present invention.

FIG. 6 is a flow chart of a method for synchronizing heartbeat behavior according to a twelfth embodiment of the present invention. According to this embodiment, a period list including a period length of a periodic location area update and a DRX interception period length and a time list including update time of the periodic location area update and DRX interception time are used as examples to describe technical solutions in detail in this embodiment. As shown in FIG. 6, the method provided in this embodiment includes:

Step 601: Acquire the period list and the time list, where the period list includes the period length of the periodic location area update and the DRX interception period length, and the time list includes the update time of the periodic location area update and the DRX interception time.

Step 602: Set the period length of the periodic location area update as a period length of uplink heartbeat behavior.

Step 603: According to the update time TKL of the periodic location area update in the time list, a heartbeat period $T^{basic}$, and a preset multiple K, use the formula (2)

$$T_1^{start}=TKL+K*T^{basic} \quad (2)$$

to acquire first synchronization time $T_1^{start}$.

Step 604: Perform the location area update by using the period length of the uplink heartbeat behavior as a period from the first synchronization time, where the DRX interception period length is set as the heartbeat period, and the DRX interception time is set as triggering time of the heartbeat.

According to this embodiment, the DRX interception period length and the DRX interception time are constant, therefore, the DRX interception period length and the DRX interception time can be used as the heartbeat period and the triggering time of the heartbeat, respectively. In addition, specifically, the DRX interception period length and the DRX interception time are collected, the DRX interception period length is recorded into the period list, and the DRX interception time is recorded into the time list, where the DRX interception period length is a period length for performing circuit switched paging, and the DRX interception time is an initial time of the circuit switched paging. It should be noted that the DRX interception period length and the DRX interception time are acquired by negotiating with a base station during registration of a mobile phone and are stored in the mobile phone.

According to this embodiment, first the period length of the periodic location area update is set as the period length of the uplink heartbeat behavior; then the first synchronization time is acquired according to the update time of the periodic location area update in the time list, the heartbeat period, and the preset multiple; finally the location area update is performed by using the period length of the uplink heartbeat behavior as the period from the first synchronization time, the DRX interception period length is set as the heartbeat period, and the DRX interception time is set as the triggering time of the heartbeat. In this way, the circuit switched paging and the location area update can be performed simultaneously, and power consumption of an apparatus for synchronizing the heartbeat behavior is effectively reduced.

Figure 7:
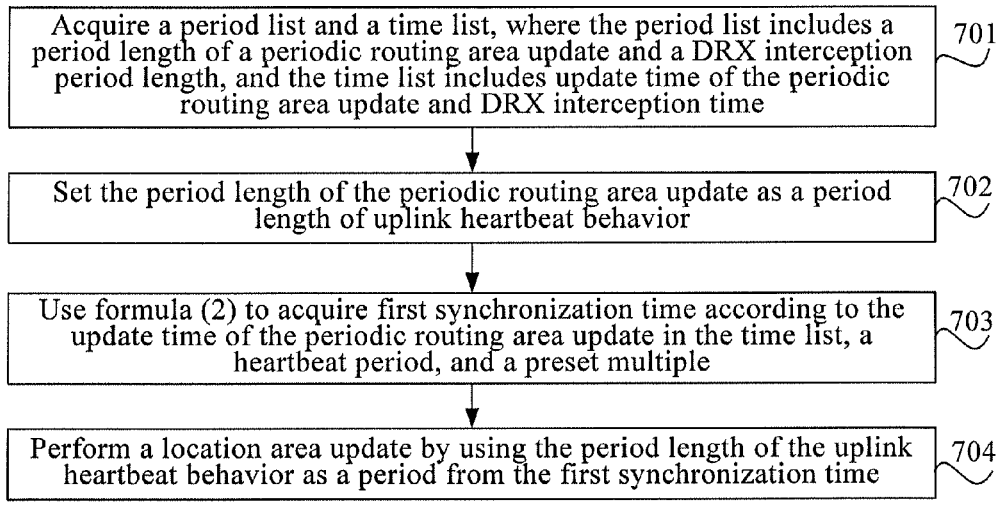
FIG. 7 is a flow chart of a method for synchronizing heartbeat behavior according to a thirteenth embodiment of the present invention.

FIG. 7 is a flow chart of a method for synchronizing heartbeat behavior according to a thirteenth embodiment of the present invention. According to this embodiment, a period list including a period length of a periodic routing area update and a DRX interception period length and a time list including update time of the periodic routing area update and DRX interception time are used as examples to describe technical solutions in detail in this embodiment. As shown in FIG. 7, the method provided in this embodiment includes:

Step 701: Acquire the period list and the time list, where the period list includes the period length of the periodic routing area update and the DRX interception period length, and the time list includes the update time of the periodic routing area update and the DRX interception time.

Step 702: Set the period length of the periodic routing area update as a period length of uplink heartbeat behavior.

Step 703: According to the update time TKR of the periodic routing area update in the time list, a heartbeat period $T^{basic}$, and a preset multiple K, use the formula (2)

$$T_1^{start}=TKR+K*T^{basic} \quad (2)$$

to acquire first synchronization time $T_1^{start}$.

Step 704: Perform the location area update by using the period length of the uplink heartbeat behavior as a period from the first synchronization time, where:

the DRX interception period length is set as the heartbeat period, and the DRX interception time is set as triggering time of the heartbeat.

According to this embodiment, the DRX interception period length and the DRX interception time are constant, therefore, the DRX interception period length and the DRX interception time can be used as the heartbeat period and the triggering time of the heartbeat, respectively. In addition, specifically, the DRX interception period length and the DRX interception time are collected, the DRX interception period length is recorded into the period list, and the DRX interception time is recorded into the time list, where the DRX interception period length is a period length for performing circuit switched paging, and the DRX interception time is an initial time of the circuit switched paging. It should be noted that the DRX interception period length and the DRX interception time are acquired by negotiating with a base station during registration of a mobile phone and are stored in the mobile phone.

According to this embodiment, first the period length of the periodic routing area update is set as the period length of the uplink heartbeat behavior; then the first synchronization time is acquired according to the update time of the periodic routing area update in the time list, the heartbeat period, and the preset multiple; finally the routing area update is performed by using the period length of the uplink heartbeat behavior as the period from the first synchronization time, the DRX interception period length is set as the heartbeat period, and the DRX interception time is set as the triggering time of the heartbeat. In this way, the circuit switched paging and the routing area update can be performed simultaneously, and power consumption of an apparatus for synchronizing the heartbeat behavior is effectively reduced.

Figure 8:
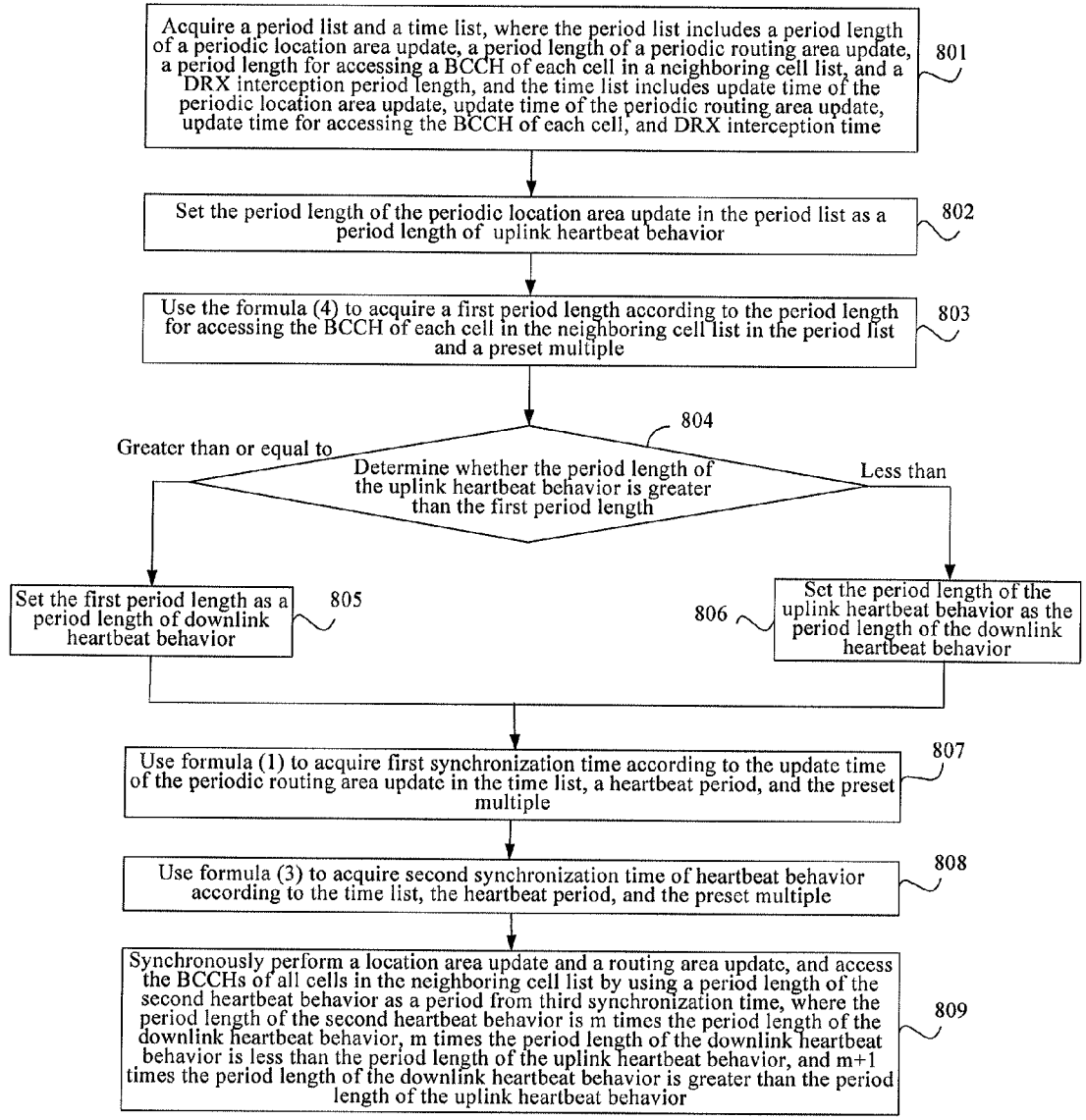
FIG. 8 is a flow chart of a method for synchronizing heartbeat behavior according to a fourteenth embodiment of the present invention.

FIG. 8 is a flow chart of a method for synchronizing heartbeat behavior according to a fourteenth embodiment of the present invention. According to this embodiment, mainly a circuit switched domain where update time of a routing area update is later than update time of a location area update is used as an example to describe technical solutions in detail in this embodiment. As shown in FIG. 8, the implementation subject in this embodiment is an apparatus for synchronizing the heartbeat behavior. This method includes:

Step 801: Acquire a period list and a time list, where the period list includes a period length of a periodic location area update, a period length of a periodic routing area update, a period length for accessing a BCCH of each cell in a neighboring cell list, and a DRX interception period length, and the time list includes update time of the periodic location area update, update time of the periodic routing area update, update time for accessing the BCCH of each cell, and DRX interception time.

For example, the period list is shown in Table 1.

TABLE 1

| Function | Link Type | Period Length |
|---|---|---|
| Periodic location area update | Uplink, downlink | TL |
| Periodic routing area update | Uplink, downlink | TR |
| Accessing a BCCH of cell C1 | Downlink | T1 |
| Accessing a BCCH of cell C2 | Downlink | T2 |

TABLE 1-continued

| Function | Link Type | Period Length |
|---|---|---|
| Accessing a BCCH of cell C3 | Downlink | T3 |
| ... | ... | ... |
| Accessing a BCCH of cell Cn | Downlink | Tn |
| DRX interception | Downlink | $T^{basic}$ |

The time list is shown in Table 2.

TABLE 2

| Function | Link Type | Update Time |
|---|---|---|
| Periodic location area update | Uplink, downlink | TKL |
| Periodic routing area update | Uplink, downlink | TKR |
| Accessing a BCCH of cell C1 | Downlink | TK1 |
| Accessing a BCCH of cell C2 | Downlink | TK2 |
| Accessing a BCCH of cell C3 | Downlink | TK3 |
| ... | ... | ... |
| Accessing a BCCH of cell Cn | Downlink | TKn |
| DRX interception | Downlink | $TK^{basic}$ |

Step 802: Set the period length of the periodic location area update in the period list as a period length of uplink heartbeat behavior.

Step 803: According to the period length for accessing the BCCH of each cell in the neighboring cell list in the period list and a preset multiple K, use the formula (4)

$$TD = K^* \max(T1, \ldots, Tn) \tag{4}$$

to acquire a first period length TD; where:

T1 indicates a period length for accessing a BCCH of a 1st cell; Tn indicates a period length for accessing a BCCH of an nth cell; n is an integer and is greater than or equal to 1; and K is an integer and is greater than or equal to 1.

According to this embodiment, the preset multiple K may be preset according to network environment, where the network environment may be information about signal strength, signal-to-noise ratio, and the like. For example, the stronger a signal is, the greater the preset multiple is set.

Step 804: Determine whether the period length of the uplink heartbeat behavior is greater than the first period length. If the period length of the uplink heartbeat behavior is greater than or equal to the first period length, perform step 805. If the period length of the uplink heartbeat behavior is less than the first period length, perform step 806.

Step 805: Set the first period length as a period length of downlink heartbeat behavior, and perform step 807.

Step 806: Set the period length of the uplink heartbeat behavior as a period length of downlink heartbeat behavior, and perform step 807.

Step 807: According to the update time TKR of the periodic routing area update in the time list, a heartbeat period $T^{basic}$, and the preset multiple K, use the formula (1)

$$T_1^{start} = TKR + K^* T^{basic} \tag{1}$$

to acquire first synchronization time $T_1^{start}$.

Step 808: According to the time list, the DRX interception period length $T^{basic}$, and the preset multiple, use the formula (3)

$$T_2^{start} = TKn + K^* T^{basic} \tag{3}$$

to acquire second synchronization time $T_2^{start}$; where:

TKn is the update time for accessing the BCCH of the cell that is last added into the neighboring cell list.

Step 809: Synchronously perform the location area update and the routing area update, and access the BCCHs of all cells in the neighboring cell list by using the period length of the second heartbeat behavior as a period from third synchronization time, where the period length of the second heartbeat behavior is m times the period length of the downlink heartbeat behavior, m times the period length of the downlink heartbeat behavior is less than the period length of the uplink heartbeat behavior, m+1 times the period length of the downlink heartbeat behavior is greater than the period length of the uplink heartbeat behavior, and m is an integer and is greater than or equal to 1.

The period length of the uplink heartbeat behavior or the period length of the downlink heartbeat behavior is the DRX interception period length, and the triggering time of the heartbeat is the DRX interception time.

It should be noted that when the first synchronization time is later than the second synchronization time, the third synchronization time is the first synchronization time; and when the second synchronization time is later than the first synchronization time, the third synchronization time is the second synchronization time.

According to this embodiment, three types of heartbeat behavior are updated at the same synchronization time, that is, the third synchronization time, and can be synchronously updated at an interval of one heartbeat period. Therefore, synchronization of the three types of heartbeat behavior is implemented.

Figure 9A:
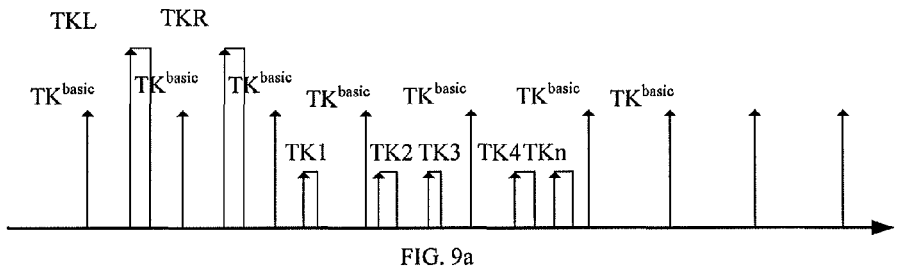
FIG. 9a illustrates the effects of heartbeat behavior performed by a mobile phone in the prior art.
Figure 9B:
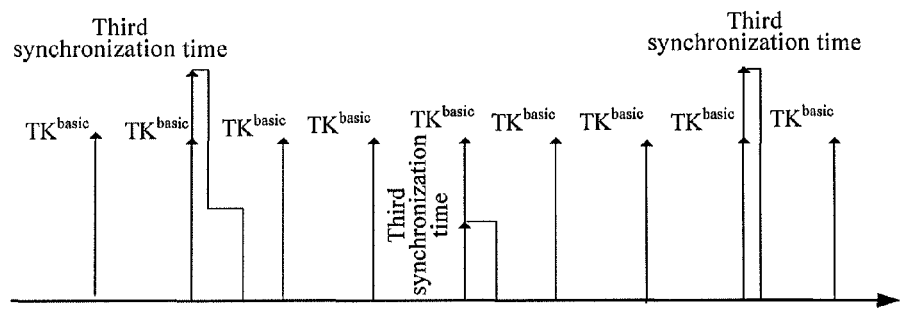
FIG. 9b illustrates the effects of heartbeat behavior performed by a mobile phone according to the present invention.

According to this embodiment, FIG. 9a illustrates the effects of heartbeat behavior performed by a mobile phone in the prior art; FIG. 9b illustrates the effects of heartbeat behavior performed by a mobile phone according to the present invention. As shown in FIG. 9a and FIG. 9b, an abscissa axis represents a time axis, and an ordinate axis represents a power axis (for example current intensity). According to FIG. 9a, $TK^{basic}$ is a heartbeat triggering time of an apparatus for synchronizing heartbeat behavior, and $T^{basic}$ is a heartbeat period of the apparatus for synchronizing the heartbeat behavior, that is a time length from one $TK^{basic}$ to the next $TK^{basic}$. In addition, at TKL, it is necessary to establish a link and disconnect the link to implement a location area update; at TKR, it is necessary to establish a link and disconnect the link once again to implement a routing area update. At TK1, because it is not at $TK^{basic}$, it is necessary to wake up the apparatus for synchronizing the heartbeat behavior, and it is necessary to establish a link and disconnect the link once more time to access a BCCH of a 1st cell. It should be noted that an implementation principle is same as the implementation principle at TK1 at any time from TK2 to TKn, therefore it is not described herein again. According to FIG. 9b, $TK^{basic}$ is a heartbeat triggering time of an apparatus for synchronizing heartbeat behavior, and $T^{basic}$ is a heartbeat period of the apparatus for synchronizing the heartbeat behavior, that is a time length from one $TK^{basic}$ to the next $TK^{basic}$. At the third synchronization time, it is only necessary to establish a link and disconnect the link to implement a location area update, a routing area update, and circuit switched paging, and access a BCCH of each cell in a neighboring cell list, therefore three types of heartbeat behavior is effectively synchronized. In addition, it should be noted that as shown in FIG. 9b, from left to right, at the triggering time of a second heartbeat (that is the first time described in the foregoing embodiments), third synchronization time (that is the synchronization time described in the foregoing embodiments) coincides with the triggering time of the second heartbeat behavior; and the third synchronization time coincides with the triggering time of the heartbeat at an interval of the period length of the second heartbeat behavior (that is the period length of the heartbeat behavior described in the foregoing embodiments) from the triggering time of the second heartbeat.

Figure 10:
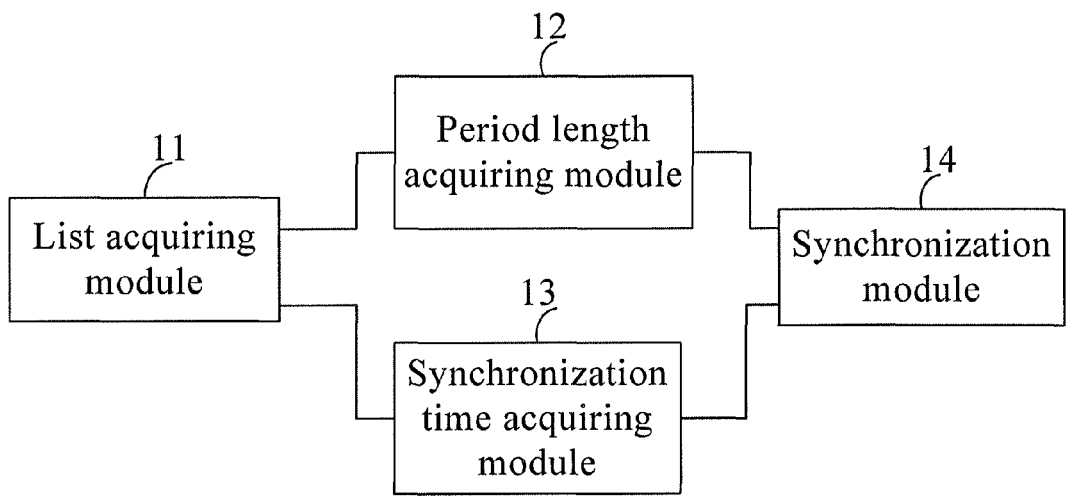
FIG. 10 is a schematic structural diagram of an apparatus for synchronizing heartbeat behavior according to a first embodiment of the present invention.

FIG. 10 is a schematic structural diagram of an apparatus for synchronizing heartbeat behavior according to a first embodiment of the present invention. As shown in FIG. 10, according to this embodiment, the apparatus for synchronizing the heartbeat behavior includes a list acquiring module 11, a period length acquiring module 12, a synchronization time acquiring module 13, and a synchronization module 14. Specifically, the list acquiring module 11 is configured to acquire a period list and a time list. The period length acquiring module 12 is configured to acquire a period length of the heartbeat behavior according to the period list acquired by the list acquiring module 11. The synchronization time acquiring module 13 is configured to acquire synchronization time according to the time list acquired by the list acquiring module 11, a heartbeat period, and a preset multiple. The synchronization module 14 is configured to synchronize at least one type of heartbeat behavior by using the period length of the heartbeat behavior acquired by the period length acquiring module 12 as a period from the synchronization time acquired by the synchronization time acquiring module 13.

According to this embodiment, the apparatus for synchronizing the heartbeat behavior can implement technical solutions of the method in the embodiment illustrated in FIG. 1, and an implementation principle is similar, therefore it is not described herein again.

According to this embodiment, the period length of the heartbeat behavior is acquired according to the acquired period list; the synchronization time is acquired according to the acquired time list, the heartbeat period, and the preset multiple; and at least one type of heartbeat behavior is synchronized by using this period length of the heartbeat behavior as the period from the synchronization time. Therefore, the following problem in the prior art is solved: a waste of power of the apparatus for synchronizing the heartbeat behavior is caused by the assynchronization of at least one type of heartbeat behavior, and further power consumption of the apparatus for synchronizing the heartbeat behavior is effectively reduced.

Further, according to a second embodiment of an apparatus for synchronizing heartbeat behavior in the present invention, on the basis of the embodiment illustrated in FIG. 10, the list acquiring module 11 is configured to acquire the period list and the time list, where the period list includes a period length of a periodic location area update and a period length of a periodic routing area update, and the time list includes update time of the periodic location area update and update time of the periodic routing area update. A period length setting module of uplink heartbeat behavior and the period length acquiring module 12 are configured to set the period length of the periodic location area update or the period length of the periodic routing area update acquired by the list acquiring module 11 as a period length of uplink heartbeat behavior. The synchronization time acquiring module 13 is configured to acquire first synchronization time of the heartbeat behavior according to the time list and the period length of the periodic location area update and the period length of the routing area update in the period list acquired by the list acquiring module 11, the heartbeat period, and the preset multiple. The synchronization module 14 is configured to synchronously perform a location area update and a routing area update by using the period length of the uplink heartbeat behavior set by the period length acquiring module 12 as the period from the first synchronization time of the heartbeat behavior acquired by the synchronization time acquiring module 13.

According to this embodiment, the apparatus for synchronizing the heartbeat behavior can implement technical solutions of the method in the embodiment illustrated in FIG. 2, and the implementation principle is similar, therefore it is not described herein again.

According to this embodiment, first the period length of the periodic location area update or the period length of the periodic routing area update in the acquired period list is set as the period length of the uplink heartbeat behavior; then the first synchronization time of the heartbeat behavior is acquired according to the acquired time list, the heartbeat period, and the preset multiple; finally the location area update and the routing area update are performed synchronously by using the period length of the uplink heartbeat behavior as the period from the first synchronization time of the heartbeat behavior. In this way, the problem of asynchronization between the location area update and the routing area update in the prior art is solved, and further the power consumption of the apparatus for synchronizing the heartbeat behavior is effectively reduced.

Further, according to a third embodiment of an apparatus for synchronizing heartbeat behavior in the present invention, on the basis of the second embodiment, the period list includes a DRX interception period length, the time list includes DRX interception time, and the apparatus for synchronizing the heartbeat behavior includes a heartbeat setting module that is configured to set the DRX interception period length acquired by the list acquiring module as the heartbeat period and set the DRX interception time acquired by the list acquiring module as triggering time of the heartbeat.

Further, according to a fourth embodiment of an apparatus for synchronizing heartbeat behavior in the present invention, on the basis of the second or the third embodiment, the synchronization time acquiring module 13 is specifically configured to, when the update time of the routing area update is later than the update time of the location area update, use a formula $T_1^{start}=TKR+K*T^{basic}$ to acquire first synchronization time $T_1^{start}$ of the heartbeat behavior according to the update time TKR of the periodic routing area update in the time list, the heartbeat period $T^{basic}$ and the preset multiple K; or, the synchronization time acquiring module 13 is specifically configured to, when the update time of the location area update is later than the update time of the routing area update, use a formula $T_1^{start}=TKL+K*T^{basic}$ to acquire the first synchronization time $T_1^{start}$ of the heartbeat behavior according to the update time TKL of the periodic location area update in the time list, the heartbeat period $T^{basic}$, and the preset multiple K; where:

K is an integer and is greater than or equal to 1.

Preferably, for the purpose of further reducing the power consumption of the apparatus for synchronizing the heartbeat behavior, the period list includes a period length for accessing a BCCH of each cell in a neighboring cell list, the time list includes update time for accessing the BCCH of each cell in the neighboring cell list, and the period length acquiring module 12 is further configured to set a period length of downlink heartbeat behavior according to the period list acquired by the list acquiring module 11, the preset multiple, and the period length of the uplink heartbeat behavior set by the period length acquiring module 12.

The synchronization time acquiring module 13 is further configured to query the update time for accessing the BCCH of each cell in the neighboring cell list in the time list, acquire update time TKn for accessing a BCCH of a cell that is last added into the neighboring cell list, and use a formula $T_2^{start}=TKn+K*T^{basic}$ to acquire second synchronization time $T_2^{start}$ of the heartbeat behavior according to the update time TKn for accessing the BCCH of the cell that is last added into the neighboring cell list, the DRX interception period length $T^{basic}$, and the preset multiple K.

The synchronization module 14 is further configured to access the BCCHs of all cells in the neighboring cell list by using the period length of the downlink heartbeat behavior as the period from the second synchronization time of the heartbeat behavior; where:

K is an integer and is greater than or equal to 1.

More preferably, the period length acquiring module 12 includes a first period length acquiring unit and a period length acquiring unit, where the first period length acquiring unit is configured to use a formula TD=K*max (T1, . . . , Tn) to acquire a first period length TD according to the period length for accessing the BCCH of each cell in the neighboring cell list in the period list acquired by the list acquiring module 11 and the preset multiple K, and the period length acquiring unit is configured to, when the period length of the uplink heartbeat behavior set by the period length acquiring module 12 is greater than or equal to the first period length acquired by the first period length acquiring unit, set the first period length as the period length of the downlink heartbeat behavior, or the period length acquiring unit is further configured to, when the period length of the uplink heartbeat behavior is less than the first period length, set the period length of the uplink heartbeat behavior as the period length of the downlink heartbeat behavior; where:

T1 indicates a period length for accessing a BCCH of a 1st cell; Tn indicates a period length for accessing a BCCH of an nth cell; and n is an integer and is greater than or equal to 1.

More preferably, for the purpose of further reducing the power consumption of the apparatus for synchronizing the heartbeat behavior, the synchronization module 14 is further configured to synchronously perform the location area update and the routing area update, and access the BCCHs of all cells in the neighboring cell list by using a period length of second heartbeat behavior as the period from third synchronization time;

when the first synchronization time is later than the second synchronization time, the third synchronization time is the first synchronization time; or when the second synchronization time is later than the first synchronization time, the third synchronization time is the second synchronization time.

The period length of the second heartbeat behavior is m times the period length of the downlink heartbeat behavior, m times the period length of the downlink heartbeat behavior is less than the period length of the uplink heartbeat behavior, m+1 times the period length of the downlink heartbeat behavior is greater than the period length of the uplink heartbeat behavior, and m is an integer and is greater than or equal to 1.

Further, according to a fifth embodiment of an apparatus for synchronizing heartbeat behavior in the present invention, on the basis of the embodiment illustrated in FIG. 10, the list acquiring module 11 is configured to acquire the period list and the time list, where the period list includes a period length for accessing a BCCH of each cell in a neighboring cell list, and the time list includes update time for accessing the BCCH of each cell in the neighboring cell list. The period length acquiring module 12 is configured to use a formula TD=K*max(T1, . . . , Tn) to acquire a first period length TD according to the preset multiple K and the period length for accessing the BCCH of each cell in the neighboring cell list in the period list acquired by the list acquiring module 11, and set the first period length TD as a period length of downlink heartbeat behavior. The synchronization time acquiring module 13 is configured to query the update time for accessing the BCCH of each cell in the neighboring cell list in the time list acquired by the list acquiring module 11, acquire update time TKn for accessing a BCCH of a cell that is last added into the neighboring cell list, and use a formula $T_2^{start}$=TKn+ $K*T^{basic}$ to acquire second synchronization time $T_2^{start}$ of the heartbeat behavior according to the update time TKn for accessing the BCCH of the cell that is last added into the neighboring cell list, the heartbeat period $T^{basic}$, and the preset multiple K. The synchronization module 14 is configured to access the BCCHs of all cells in the neighboring cell list by using the period length of the downlink heartbeat behavior set by the period length acquiring module 12 as the period from the second synchronization time of the heartbeat behavior acquired by the synchronization time acquiring module 13, where K is an integer and is greater than or equal to 1; T1 indicates a period length for accessing a BCCH of a 1st cell; Tn indicates the period length for accessing a BCCH of an nth cell; and n is an integer and is greater than or equal to 1.

According to this embodiment, the apparatus for synchronizing the heartbeat behavior can implement technical solutions of the method in the embodiment illustrated in FIG. 3, and the implementation principle is similar, therefore it is not described herein again.

According to this embodiment, first the period length of the downlink heartbeat behavior is acquired according to the preset multiple and the period length for accessing the BCCH of each cell in the neighboring cell list in the period list; then the second synchronization time of the heartbeat behavior is acquired according to the update time for accessing the BCCH of each cell in the neighboring cell list in the time list, the heartbeat period, and the preset multiple; finally the BCCHs of all cells in the neighboring cell list are accessed by using the period length of the downlink heartbeat behavior as the period from the second synchronization time of the heartbeat behavior. In this way, the problem of synchronously accessing the BCCH of each cell in the neighboring cell list in the prior art is solved, and further power consumption of the apparatus for synchronizing the heartbeat behavior is effectively reduced.

Further, according to a sixth embodiment of an apparatus for synchronizing heartbeat behavior in the present invention, on the basis of the fifth embodiment, the period list includes a DRX interception period length, the time list includes DRX interception time, and the apparatus for synchronizing the heartbeat behavior includes a heartbeat setting module that is configured to set the DRX interception period length acquired by the list acquiring module as the heartbeat period and set the DRX interception time acquired by the list acquiring module as triggering time of the heartbeat.

Further, according to a seventh embodiment of an apparatus for synchronizing heartbeat behavior in the present invention, on the basis of the fifth embodiment or the sixth embodiment, the period list includes a period length of a periodic location area update and a period length of a periodic routing area update, the time list includes update time of the periodic location area update and update time of the periodic routing area update, and the period length acquiring module 12 is configured to set the period length of the periodic location area update or the period length of the periodic routing area update acquired by the list acquiring module 11 as a period length of uplink heartbeat behavior.

The synchronization time acquiring module 13 is further configured to acquire first synchronization time of the heartbeat behavior according to the time list, the DRX interception period length and the preset multiple.

The synchronization module 14 is further configured to synchronously perform a location area update and a routing area update by using the period length of the uplink heartbeat behavior set by the period length acquiring module as the period from the first synchronization time of the heartbeat behavior.

The period length of the uplink heartbeat behavior is the DRX interception period length.

Preferably, the synchronization time acquiring module 13 is specifically configured to, when the update time of the routing area update is later than the update time of the location area update, use a formula $T_1^{start}=TKR+K*T^{basic}$ to acquire the first synchronization time $T_1^{start}$ of the heartbeat behavior according to the update time TKR of the periodic routing area update in the time list, the heartbeat period $T^{basic}$, and the preset multiple K; or, the synchronization time acquiring module 13 is further specifically configured to, when the update time of the location area update is later than the update time of the routing area update, use a formula $T_1^{start}=TKL+K*T^{basic}$ to acquire the first synchronization time $T_1^{start}$ of the heartbeat behavior according to the update time TKL of the periodic location area update in the time list, the heartbeat period $T^{basic}$, and the preset multiple K; where:

K is an integer and is greater than or equal to 1.

More preferably, the period length acquiring module 12 includes a first period length acquiring unit and a period length acquiring unit. Specifically, the first period length acquiring unit is configured to use the formula $TD=K*\max(T1, \ldots, Tn)$ to acquire first period length TD according to the preset multiple K and the period length for accessing the BCCH of each cell in the neighboring cell list in the period list acquired by the list acquiring module 11. The period length acquiring unit is configured to, when the period length of the uplink heartbeat behavior set by the period length acquiring module is greater than or equal to the first period length acquired by the first period length acquiring unit, set the first period length TD as the period length of the downlink heartbeat behavior.

More preferably, the period length acquiring unit is further configured to, when the period length of the uplink heartbeat behavior is less than the first period length, set the period length of the uplink heartbeat behavior as the period length of the downlink heartbeat behavior.

More preferably, the synchronization module 14 is further configured to, when the period length of the uplink heartbeat behavior is greater than or equal to the period length of the downlink heartbeat behavior, synchronously perform the location area update and the routing area update, and access the BCCHs of all cells in the neighboring cell list by using the period length of the second heartbeat behavior as the period from the third synchronization time, where the period length of the second heartbeat behavior is m times the period length of the downlink heartbeat behavior, m times the period length of the downlink heartbeat behavior is less than the period length of the uplink heartbeat behavior, m+1 times the period length of the downlink heartbeat behavior is greater than the period length of the uplink heartbeat behavior, and m is an integer and is greater than or equal to 1; or, the synchronization module 14 is further configured to, when the period length of the uplink heartbeat behavior is less than the period length of the downlink heartbeat behavior, synchronously perform the location area update and the routing area update, and access the BCCHs of all cells in the neighboring cell list by using the period length of the uplink heartbeat behavior as the period from the third synchronization time, where:

when the first synchronization time is later than the second synchronization time, the third synchronization time is the first synchronization time; or when the second synchronization time is later than the first synchronization time, the third synchronization time is the second synchronization time.

Further, according to an eighth embodiment of an apparatus for synchronizing heartbeat behavior in the present invention, on the basis of the embodiment illustrated in FIG. 10, when the period list acquired by the list acquiring module 11 includes a period length of a periodic location area update and a period length for accessing a BCCH of each cell in a neighboring cell list, and the time list includes update time of the periodic location area update and update time for accessing the BCCH of each cell in the neighboring cell list, the period length acquiring module 12 is specifically configured to set the period length of the periodic location area update as a period length of uplink heartbeat behavior, use a formula $TD=K*\max(T1, \ldots, Tn)$ to acquire a first period length TD according to the preset multiple K and the period length for accessing the BCCH of each cell in the neighboring cell list in the period list, and set the first period length TD as a period length of downlink heartbeat behavior.

The synchronization time acquiring module 13 is specifically configured to use a formula $T_1^{start}=TKL+K*T^{basic}$ to acquire first synchronization time $T_1^{start}$ according to the update time TKL of the periodic location area update in the time list, the heartbeat period $T^{basic}$, and the preset multiple K, query the update time for accessing the BCCH of each cell in the neighboring cell list in the time list, acquire update time TKn for accessing a BCCH of a cell that is last added into the neighboring cell list, and use a formula $T_2^{start}=TKn+K*T^{basic}$ to acquire second synchronization time $T_2^{start}$ according to the update time TKn for accessing the BCCH of the cell that is last added into the neighboring cell list, the heartbeat period $T^{basic}$ and the preset multiple K.

The synchronization module 14 is specifically configured to, when the period length of the uplink heartbeat behavior is greater than or equal to the period length of the downlink heartbeat behavior, synchronously perform a location area update and access the BCCHs of all cells in the neighboring cell list by using the period length of the second heartbeat behavior as the period from third synchronization time, where the period length of the second heartbeat behavior is m times the period length of the downlink heartbeat behavior, m times the period length of the downlink heartbeat behavior is less than the period length of the uplink heartbeat behavior, m+1 times the period length of the downlink heartbeat behavior is greater than the period length of the uplink heartbeat behavior, and m is an integer and is greater than or equal to 1.

The synchronization module 14 is further specifically configured to, when the period length of the uplink heartbeat behavior is less than the period length of the downlink heartbeat behavior, synchronously perform the location area update and access the BCCHs of all cells in the neighboring cell list by using the period length of the uplink heartbeat behavior as the period from the third synchronization time, where:

when the first synchronization time is later than the second synchronization time, the third synchronization time is the first synchronization time; or when the second synchronization time is later than the first synchronization time, the third synchronization time is the second synchronization time; and each of the location area update and the access to the BCCHs of all cells in the neighboring cell list is a type of heartbeat behavior.

Preferably, the period list acquired by the list acquiring module further includes a DRX interception period length, the time list further includes DRX interception time, and the apparatus for synchronizing the heartbeat behavior further includes a heartbeat setting module that is configured to set the DRX interception period length as the heartbeat period and set the DRX interception time as triggering time of the heartbeat.

Further, according to a ninth embodiment of an apparatus for synchronizing heartbeat behavior in the present invention, on the basis of the embodiment illustrated in FIG. 10, when the period list acquired by the list acquiring module 11 includes a period length of a periodic routing area update and a period length for accessing a BCCH of each cell in a neighboring cell list, and the time list includes update time of the periodic routing area update and update time for accessing the BCCH of each cell in the neighboring cell list, the period length acquiring module 12 is specifically configured to set the period length of the periodic routing area update as a period length of uplink heartbeat behavior, use a formula TD=K*max (T1, ..., Tn) to acquire a first period length TD according to the preset multiple K and the period length for accessing the BCCH of each cell in the neighboring cell list in the period list, and set the first period length TD as a period length of downlink heartbeat behavior.

The synchronization time acquiring module 13 is specifically configured to use a formula $T_1^{start}=TKR+K*T^{basic}$ to acquire first synchronization time $T_1^{start}$ according to the update time TKR of the periodic routing area update in the time list, the heartbeat period $T^{basic}$, and the preset multiple K, query the update time for accessing the BCCH of each cell in the neighboring cell list in the time list, acquire update time TKn for accessing a BCCH of a cell that is last added into the neighboring cell list, and use a formula $T_2^{start}=TKn+K*T^{basic}$ toacquire second synchronization time $T_2^{start}$ according to the update time TKn for accessing the BCCH of the cell that is last added into the neighboring cell list, the heartbeat period $T^{basic}$, and the preset multiple K.

The synchronization module 14 is specifically configured to, when the period length of the uplink heartbeat behavior is greater than or equal to the period length of the downlink heartbeat behavior, synchronously perform a routing area update and access the BCCHs of all cells in the neighboring cell list by using the period length of the second heartbeat behavior as the period from third synchronization time, where the period length of the second heartbeat behavior is m times the period length of the downlink heartbeat behavior, m times the period length of the downlink heartbeat behavior is less than the period length of the uplink heartbeat behavior, m+1 times the period length of the downlink heartbeat behavior is greater than the period length of the uplink heartbeat behavior, and m is an integer and is greater than or equal to 1.

The synchronization module 14 is further specifically configured to, when the period length of the uplink heartbeat behavior is less than the period length of the downlink heartbeat behavior, synchronously perform the routing area update and access the BCCHs of all cells in the neighboring cell list by using the period length of the uplink heartbeat behavior as the period from the third synchronization time, where:

when the first synchronization time is later than the second synchronization time, the third synchronization time is the first synchronization time; or when the second synchronization time is later than the first synchronization time, the third synchronization time is the second synchronization time; and each of the routing area update and the access to the BCCHs of all cells in the neighboring cell list is a type of heartbeat behavior.

Preferably, the period list acquired by the list acquiring module further includes a DRX interception period length, the time list further includes DRX interception time, and the apparatus for synchronizing the heartbeat behavior further includes a heartbeat setting module that is configured to set the DRX interception period length as the heartbeat period and set the DRX interception time as triggering time of the heartbeat.

Further, according to a tenth embodiment of an apparatus for synchronizing heartbeat behavior in the present invention, on the basis of the embodiment illustrated in FIG. 10, when the period list acquired by the list acquiring module 11 includes a period length of a periodic location area update and a DRX interception period length, and the time list includes update time of the periodic location area update and DRX interception time, the period length acquiring module 12 is specifically configured to set the period length of the periodic location area update as a period length of uplink heartbeat behavior.

The synchronization time acquiring module 13 is specifically configured to use a formula $T_1^{start}=TKL+K*T^{basic}$ to acquire first synchronization time $T_1^{start}$ according to the update time TKL of the periodic location area update in the time list, the heartbeat period $T^{basic}$, and the preset multiple K.

The synchronization module 14 is specifically configured to perform a location area update by using the period length of the uplink heartbeat behavior as the period from the first synchronization time.

The apparatus for synchronizing the heartbeat behavior further includes:

a heartbeat setting module, configured to set the DRX interception period length as the heartbeat period and set the DRX interception time as triggering time of the heartbeat. Each of the location area update and the DRX interception is a type of heartbeat behavior.

Further, according to an eleventh embodiment of an apparatus for synchronizing heartbeat behavior in the present invention, on the basis of the embodiment illustrated in FIG. 10, when the period list acquired by the list acquiring module 11 includes a period length of a periodic routing area update and a DRX interception period length, and the time list includes update time of the periodic routing area update and DRX interception time, the period length acquiring module 12 is specifically configured to set the period length of the periodic routing area update as a period length of uplink heartbeat behavior.

The synchronization time acquiring module 13 is specifically configured to use a formula $T_1^{start}=TKL+K*T^{basic}$ to acquire first synchronization time $T_1^{start}$ according to the update time TKR of the periodic routing area update in the time list, the heartbeat period $T^{basic}$, and the preset multiple K.

The synchronization module 14 is specifically configured to perform a location area update by using the period length of the uplink heartbeat behavior as the period from the first synchronization time.

The apparatus for synchronizing the heartbeat behavior further includes:

a heartbeat setting module, configured to set the DRX interception period length as the heartbeat period and set the DRX interception time as triggering time of the heartbeat. Each of the routing area update and the DRX interception is a type of heartbeat behavior.

The present invention further provides an apparatus, including a memory that stores an instruction, where, according to the instruction, a processor implements the method for synchronizing heartbeat behavior according to any one of embodiments illustrated in FIGS. 1-8. Implementation principles are similar, therefore they are not described one by one herein again.

The present invention further provides another apparatus, including a processor, where the processor is configured to implement the method for synchronizing heartbeat behavior according to any one of embodiments illustrated in FIGS. 1-8. Implementation principles are similar, therefore they are not described herein again.

The present invention further provides a computer program product, where the computer program product includes computer program codes, and when the computer program codes are run on a computer, the computer program codes can enable the computer to perform the method for synchronizing heartbeat behavior according to any one of embodiments illustrated in FIGS. 1-8. Implementation principles are similar, therefore they are not described one by one herein again.

The present invention further provides a computer readable storage medium, where the computer readable storage medium stores computer program codes, and when the computer program codes are run on a computer, the computer program codes can enable the computer to perform the method for synchronizing heartbeat behavior according to any one of embodiments illustrated in FIGS. 1-8. Implementation principles are similar, therefore they are not described one by one herein again.

Persons of ordinary skill in the art should understand that all or a part of the steps of the methods in the embodiments may be implemented by a program instructing relevant hardware. The above program may be stored in a computer readable storage medium. When the program is run, the steps of the methods in the embodiments are performed. The storage medium may be any medium capable of storing program codes, including a ROM, a RAM, a magnetic disk, an optical disk, and the like.

Finally, it should be noted that the above embodiments are intended for describing the technical solutions of the present invention other than limiting the present invention. Although the present invention is described in detail with reference to the foregoing embodiments, persons of ordinary skill in the art should understand that they can still make modifications to the technical solutions described in the foregoing embodiments, or make equivalent substitutions to some or all the technical features thereof, without departing from the scope of the technical solutions of the embodiments of the present invention.

What is claimed is:

1. A method for synchronizing heartbeat behavior, comprising:
   acquiring, in a processor, a period list and a time list;
   acquiring, in a processor, a period length of the heartbeat behavior according to the period list, and acquiring synchronization time according to the time list, a heartbeat period, and a preset multiple; and
   synchronizing at least one type of heartbeat behavior by using the period length of the heartbeat behavior as a period from the synchronization time;
   wherein when the period list comprises a period length of a periodic location area update and a period length of a periodic routing area update, and the time list comprises update time of the periodic location area update and update time of the periodic routing area update, acquiring a period length of the heartbeat behavior according to the period list, and
   wherein acquiring a synchronization time according to the time list, a heartbeat period, and a preset multiple comprises:
   setting the period length of the periodic location area update or the period length of the periodic routing area update as a period length of uplink heartbeat behavior; and
   acquiring first synchronization time of the heartbeat behavior according to the update time of the periodic location area update and the update time of the periodic routing area update in the time list, the heartbeat period, and the preset multiple;
   wherein synchronizing at least one type of heartbeat behavior by using the period length of the heartbeat behavior as a period from the synchronization time comprises:
   synchronously performing a location area update and a routing area update by using the period length of the uplink heartbeat behavior as the period from the first synchronization time, wherein
   each of the location area update and the routing area update is a type of heartbeat behavior;
   wherein the setting the period length of the periodic location area update or the period length of the periodic routing area update as a period length of uplink heartbeat behavior comprises:
   when a voice service has a higher priority than a data service, setting the period length of the periodic location area update as the period length of the uplink heartbeat behavior; and
   when the data service has a higher priority than the voice service, setting the period length of the periodic routing area update as the period length of the uplink heartbeat behavior.

2. The method for synchronizing the heartbeat behavior according to claim 1, wherein acquiring first synchronization time of the heartbeat behavior according to the time list, the heartbeat period, and the preset multiple comprises:
   when the update time of the routing area update is later than the update time of the location area update, using a formula to acquire the first synchronization time of the heartbeat behavior according to the update time of the periodic routing area update in the time list, the heartbeat period, and the preset multiple; and
   when the update time of the location area update is later than the update time of the routing area update, using a formula to acquire the first synchronization time of the heartbeat behavior according to the update time of the periodic location area update in the time list, the heartbeat period, and the preset multiple,
   wherein is an integer and is greater than or equal to 1.

3. The method according to claim 2, herein the period list further comprises a period length for accessing a Broadcast Control Channel (BCCH) of each cell in a neighboring cell list, and the time list further comprises update time for accessing the BCCH of each cell in the neighboring cell list, the method further comprises:
   setting a period length of downlink heartbeat behavior according to the period list, the preset multiple, and the period length of the uplink heartbeat behavior;
   querying the update time for accessing the BCCH of each cell in the neighboring cell list in the time list, acquiring update time for accessing a BCCH of a cell that is last added into the neighboring cell list, and using a formula to acquire second synchronization time of the heartbeat behavior according to the update time for accessing the BCCH of the cell that is last added into the neighboring cell list, the heartbeat period, and the preset multiple; and
   accessing the BCCHs of all cells in the neighboring cell list by using the period length of the downlink heartbeat behavior as a period from the second synchronization time of the heartbeat behavior, wherein is an integer and is greater than or equal to 1.

4. The method according to claim 3, wherein the setting a period length of downlink heartbeat behavior according to the period list, the preset multiple, and the period length of the uplink heartbeat behavior comprises:

using a formula to acquire a first period length according to the period length for accessing the BCCH of each cell in the neighboring cell list in the period list and the preset multiple;

when the period length of the uplink heartbeat behavior is greater than or equal to the first period length, setting the first period length as the period length of the downlink heartbeat behavior; and when the period length of the uplink heartbeat behavior is less than the first period length, setting the period length of the uplink heartbeat behavior as the period length of the downlink heartbeat behavior; wherein:

indicates a period length for accessing a BCCH of a 1st cell; indicates a period length for accessing a BCCH of an th cell; and is an integer and is greater than or equal to 1.

5. The method according to claim 4, further comprising:

synchronously performing the location area update and the routing area update, and accessing the BCCHs of all cells in the neighboring cell list by using the period length of second heartbeat behavior as a period from third synchronization time; wherein:

when the first synchronization time is later than the second synchronization time, the third synchronization time is the first synchronization time; or when the second synchronization time is later than the first synchronization time, the third synchronization time is the second synchronization time; and the period length of the second heartbeat behavior is times the period length of the downlink heartbeat behavior, times the period length of the downlink heartbeat behavior is less than the period length of the uplink heartbeat behavior, times the period length of the downlink heartbeat behavior is greater than the period length of the uplink heartbeat behavior, and is an integer and is greater than or equal to 1.

6. The method according to claim 1, wherein when the period list comprises a period length for accessing a Broadcast Control Channel (BCCH) of each cell in a neighboring cell list, and the time list comprises update time for accessing the BCCH of each cell in the neighboring cell list, the acquiring a period length of the heartbeat behavior according to the period list, and acquiring synchronization time according to the time list, a heartbeat period, and a preset multiple comprises:

using a formula to acquire a first period length according to the preset multiple and the period length for accessing the BCCH of each cell in the neighboring cell list in the period list, and setting the first period length as a period length of downlink heartbeat behavior; and querying the update time for accessing the BCCH of each cell in the neighboring cell list in the time list, acquiring update time for accessing a BCCH of a cell that is last added into the neighboring cell list, and using a formula to acquire second synchronization time of the heartbeat behavior according to the update time for accessing the BCCH of the cell that is last added into the neighboring cell list, the heartbeat period, and the preset multiple;

the synchronizing at least one type of heartbeat behavior by using the period length of the heartbeat behavior as a period from the synchronization time comprises:

accessing BCCHs of all cells in the neighboring cell list by using the period length of the downlink heartbeat behavior as the period from the second synchronization time; and the accessing the BCCH of a cell in the neighboring cell list is a type of heartbeat behavior; wherein:

is an integer and is greater than or equal to 1; indicates a period length for accessing a BCCH of a 1st cell; indicates a period length for accessing a BCCH of an th cell; and is an integer and is greater than or equal to 1.

7. The method according to claim 6, wherein the period list further comprises a period length of a periodic location area update and a period length of a periodic routing area update, and the time list further comprises update time of the periodic location area update and update time of the periodic routing area update, the method further comprises:

setting the period length of the periodic location area update or the period length of the periodic routing area update as a period length of uplink heartbeat behavior;

acquiring first synchronization time of the heartbeat behavior according to the update time of the periodic location area update or the update time of the periodic routing area update in the time list, the heartbeat period, and the preset multiple; and synchronously performing a location area update and a routing area update by using the period length of the uplink heartbeat behavior as the period from the first synchronization time of the heartbeat behavior.

8. The method according to claim 7, wherein the acquiring first synchronization time of the heartbeat behavior according to the update time of the periodic location area update or the update time of the periodic routing area update in the time list, the heartbeat period, and the preset multiple comprises:

when the update time of the routing area update is later than the update time of the location area update, using a formula to acquire the first synchronization time of the heartbeat behavior according to the update time of the periodic routing area update in the time list, the heartbeat period, and the preset multiple; and when the update time of the location area update is later than the update time of the routing area update, using a formula to acquire the first synchronization time of the heartbeat behavior according to the update time of the periodic location area update in the time list, the heartbeat period, and the preset multiple, wherein is an integer and is greater than or equal to 1.

9. The method according to claim 6, wherein the using a formula to acquire a first period length according to the preset multiple and the period length for accessing the BCCH of each cell in the neighboring cell list in the period list, and setting the first period length as a period length of downlink heartbeat behavior comprises:

using the formula to acquire the first period length according to the preset multiple and the period length for accessing the BCCH of each cell in the neighboring cell list in the period list;

when the period length of the uplink heartbeat behavior is greater than or equal to the first period length, setting the first period length as the period length of the downlink heartbeat behavior.

10. The method according to claim 9, further comprising:

when the period length of the uplink heartbeat behavior is less than the first period length, setting the period length of the uplink heartbeat behavior as the period length of the downlink heartbeat behavior.

11. The method according to claim 9, further comprising:
when the period length of the uplink heartbeat behavior is greater than or equal to the period length of the downlink heartbeat behavior, synchronously performing the location area update and the routing area update, and accessing the BCCHs of all cells in the neighboring cell list by using a period length of second heartbeat behavior as a period from third synchronization time, wherein the period length of the second heartbeat behavior is times the period length of the downlink heartbeat behavior, times the period length of the downlink heartbeat behavior is less than the period length of the uplink heartbeat behavior, times the period length of the downlink heartbeat behavior is greater than the period length of the uplink heartbeat behavior, and is an integer and is greater than or equal to 1; and when the period length of the uplink heartbeat behavior is less than the period length of the downlink heartbeat behavior, synchronously performing the location area update and the routing area update, and accessing the BCCHs of all cells in the neighboring cell list by using the period length of the uplink heartbeat behavior as the period from the third synchronization time, wherein:

when first synchronization time is later than the second synchronization time, the third synchronization time is the first synchronization time; or when the second synchronization time is later than the first synchronization time, the third synchronization time is the second synchronization time.

12. The method according to claim 1, wherein when the period list comprises a period length of a periodic location area update and a period length for accessing a Broadcast Control Channel (BCCH) of each cell in a neighboring cell list, and the time list comprises update time of the periodic location area update and update time for the BCCH of each cell in the neighboring cell list, the acquiring a period length of the heartbeat behavior according to the period list, and acquiring synchronization time according to the time list, a heartbeat period, and a preset multiple comprises:

setting the period length of the periodic location area update as a period length of uplink heartbeat behavior;

using a formula to acquire a first period length according to the preset multiple and the period length for accessing the BCCH of each cell in the neighboring cell list in the period list, and setting the first period length as a period length of downlink heartbeat behavior;

using a formula to acquire first synchronization time according to the update time of the periodic location area update in the time list, the heartbeat period, and the preset multiple; and querying the update time for accessing the BCCH of each cell in the neighboring cell list in the time list, acquiring update time for accessing a BCCH of a cell that is last added into the neighboring cell list, and using a formula to acquire second synchronization time according to the update time for accessing the BCCH of the cell that is last added into the neighboring cell list, the heartbeat period, and the preset multiple;

wherein synchronizing at least one type of heartbeat behavior by using the period length of the heartbeat behavior as a period from the synchronization time comprises:

when the period length of the uplink heartbeat behavior is greater than or equal to the period length of the downlink heartbeat behavior, synchronously performing a location area update and accessing BCCHs of all cells in the neighboring cell list by using a period length of second heartbeat behavior as a period from third synchronization time, wherein the period length of the second heartbeat behavior is times the period length of the downlink heartbeat behavior, times the period length of the downlink heartbeat behavior is less than the period length of the uplink heartbeat behavior, times the period length of the downlink heartbeat behavior is greater than the period length of the uplink heartbeat behavior, and is an integer and is greater than or equal to 1; and when the period length of the uplink heartbeat behavior is less than the period length of the downlink heartbeat behavior, synchronously performing the location area update and accessing the BCCHs of all cells in the neighboring cell list by using the period length of the uplink heartbeat behavior as the period from the third synchronization time, wherein:

when the first synchronization time is later than the second synchronization time, the third synchronization time is the first synchronization time; or when the second synchronization time is later than the first synchronization time, the third synchronization time is the second synchronization time; and each of the location area update and the access to the BCCHs of all cells in the neighboring cell list is a type of heartbeat behavior.

13. The method according to claim 1, wherein when the period list comprises a period length of a periodic routing area update and a period length for accessing a Broadcast Control Channel (BCCH) of each cell in a neighboring cell list, and the time list comprises update time of the periodic routing area update and update time for accessing the BCCH of each cell in the neighboring cell list, the acquiring a period length of the heartbeat behavior according to the period list, and acquiring synchronization time according to the time list, a heartbeat period, and a preset multiple comprises:

setting the period length of the periodic routing area update as a period length of uplink heartbeat behavior;

using a formula to acquire a first period length according to the preset multiple and the period length for accessing the BCCH of each cell in the neighboring cell list in the period list, and setting the first period length as a period length of downlink heartbeat behavior;

using a formula to acquire first synchronization time according to the update time of the periodic routing area update in the time list, the heartbeat period, and the preset multiple; and querying the update time for accessing the BCCH of each cell in the neighboring cell list in the time list, acquiring update time for accessing a BCCH of a cell that is last added into the neighboring cell list, and using a formula to acquire second synchronization time according to the update time for accessing the BCCH of the cell that is last added into the neighboring cell list, the heartbeat period, and the preset multiple;

the synchronizing at least one type of heartbeat behavior by using the period length of the heartbeat behavior as a period from the synchronization time comprises:

when the period length of the uplink heartbeat behavior is greater than or equal to the period length of the downlink heartbeat behavior, synchronously performing a routing area update and accessing BCCHs of all cells in the neighboring cell list by using a period length of second heartbeat behavior as a period from third synchronization time, wherein the period length of the second heartbeat behavior is times the period length of the downlink heartbeat behavior, times the period length of the downlink heartbeat behavior is less than the period length of the uplink heartbeat behavior, times the period length of the downlink heartbeat behavior is greater than the period length of the uplink heartbeat behavior, and is an integer and is greater than or equal to 1; and when the period length of the uplink heartbeat behavior is less than the period length of the downlink heartbeat behavior, synchronously performing the routing area update and accessing the BCCHs of all cells in the neighboring cell list by using the period length of the uplink heartbeat behavior as the period from the third synchronization time, wherein:

when the first synchronization time is later than the second synchronization time, the third synchronization time is the first synchronization time; or when the second synchronization time is later than the first synchronization time, the third synchronization time is the second synchronization time; and each of the routing area update and the access to the BCCHs of all cells in the neighboring cell list is a type of heartbeat behavior.

14. The method according to claim 1, wherein the period list further comprises a Discontinuous Reception (DRX) interception period length, and the time list further comprises DRX interception time, the method further comprises:

setting the DRX interception period length as the heartbeat period, and setting the DRX interception time as the triggering time of the heartbeat, wherein the heartbeat period is equal to the DRX interception period length; the triggering time of the heartbeat is equal to the DRX interception time; the heartbeat period is a time length between one triggering time of the heartbeat and the next triggering time of the heartbeat; the synchronization time coincides with the triggering time of the heartbeat at a first time, and after the first time, the synchronization time coincides with the heartbeat time at an interval of the period length of the heartbeat behavior.

15. The method according to claim 1, wherein when the period list comprises a period length of a periodic location area update and a Discontinuous Reception (DRX) interception period length, and the time list comprises update time of the periodic location area update and DRX interception time, the acquiring a period length of the heartbeat behavior according to the period list, and acquiring synchronization time according to the time list, a heartbeat period, and a preset multiple comprises:

setting the period length of the periodic location area update as a period length of uplink heartbeat behavior; and using a formula to acquire first synchronization time according to the update time of the periodic location area update in the time list, the heartbeat period, and the preset multiple;

the synchronizing at least one type of heartbeat behavior by using the period length of the heartbeat behavior as a period from the synchronization time comprises:

performing a location area update by using the period length of the uplink heartbeat behavior as a period from the first synchronization time, wherein:

the DRX interception period length is set as the heartbeat period; the DRX interception time is set as triggering time of the heartbeat; each of the location area update and the DRX interception is a type of heartbeat behavior;

the heartbeat period is equal to the DRX interception period length; the triggering time of the heartbeat is equal to the DRX interception time; the heartbeat period is a time length between one triggering time of the heartbeat and a next triggering time of the heartbeat; the synchronization time coincides with the triggering time of the heartbeat at a first time; and after the first time, the synchronization time coincides with the heartbeat time at an interval of the period length of the heartbeat behavior.

16. The method according to claim 1, wherein when the period list comprises a period length of a periodic routing area update and a Discontinuous Reception (DRX) interception period length, and the time list comprises update time of the periodic routing area update and DRX interception time, the acquiring a period length of the heartbeat behavior according to the period list, and acquiring synchronization time according to the time list, a heartbeat period, and a preset multiple comprises:

setting the period length of the periodic routing area update as a period length of uplink heartbeat behavior; and using a formula to acquire first synchronization time according to the update time of the periodic routing area update in the time list, the heartbeat period, and the preset multiple;

the synchronizing at least one type of heartbeat behavior by using the period length of the heartbeat behavior as a period from the synchronization time comprises:

performing a location area update by using the period length of the uplink heartbeat behavior as a period from the first synchronization time, wherein:

the DRX interception period length is set as the heartbeat period; the DRX interception time is set as triggering time of the heartbeat; each of the routing area update and the DRX interception is a type of heartbeat behavior;

the heartbeat period is equal to the DRX interception period length; the triggering time of the heartbeat is equal to the DRX interception time; the heartbeat period is a time length between one triggering time of the heartbeat and a next triggering time of the heartbeat; the synchronization time coincides with the triggering time of the heartbeat at a first time; and after the first time, the synchronization time coincides with the heartbeat time at an interval of the period length of the heartbeat behavior.

17. An apparatus for synchronizing heartbeat behavior, comprising:

a processor;

a list acquiring module, configured to acquire a period list and a time list;

a period length acquiring module, configured to acquire a period length of the heartbeat behavior according to the period list acquired by the list acquiring module;

a synchronization time acquiring module, configured to acquire synchronization time according to the time list acquired by the list acquiring module, a heartbeat period, and a preset multiple; and a synchronization module, configured to synchronize at least one type of heartbeat behavior by using the period length of the heartbeat behavior acquired by the period length acquiring module as a period from the synchronization time acquired by the synchronization time acquiring module;

wherein when the period list acquired by the list acquiring module comprises a period length of a periodic location area update and a period length of a periodic routing area update, and the time list comprises update time of the periodic location area update and update time of the periodic routing area update;

the period length acquiring module is configured to set the period length of the periodic location area update or the period length of the periodic routing area update acquired by the list acquiring module as a period length of uplink heartbeat behavior;

the synchronization time acquiring module is configured to acquire first synchronization time of the heartbeat behavior according to the update time of the periodic location area update or the update time of the periodic routing area update in the time list acquired by the list acquiring module, the heartbeat period, and the preset multiple;

the synchronization module is specifically configured to synchronously perform a location area update and a routing area update by using the period length of the uplink heartbeat behavior set by the period length acquiring module as the period from the first synchronization time acquired by the synchronization time acquiring module; and each of the location area update and the routing area update is a type of heartbeat behavior;

wherein the period length acquiring module is configured to, when a voice service has a higher priority than a data service, set the period length of the periodic location area update as the period length of the uplink heartbeat behavior; or the period length acquiring module is configured to, when the data service has a higher priority than the voice service, set the period length of the periodic routing area update as the period length of the uplink heartbeat behavior.

18. The apparatus according to claim 17, wherein the synchronization time acquiring module is specifically configured to, when the update time of the routing area update is later than the update time of the location area update, use a formula to acquire the first synchronization time of the heartbeat behavior according to the update time of the periodic routing area update in the time list, the heartbeat period, and the preset multiple; and the synchronization time acquiring module is further specifically configured to, when the update time of the location area update is later than the update time of the routing area update, use a formula to acquire the first synchronization time of the heartbeat behavior according to the update time of the periodic location area update in the time list, the heartbeat period, and the preset multiple, wherein is an integer and is greater than or equal to 1.

19. The apparatus according to claim 18, wherein the period list acquired by the list acquiring module further comprises a period length for accessing a Broadcast Control Channel (BCCH) of each cell in a neighboring cell list, the time list further comprises update time for accessing the BCCH of each cell, the period length acquiring module is further configured to set a period length of downlink heartbeat behavior according to the period list acquired by the list acquiring module, the preset multiple, and the period length of the uplink heartbeat behavior set by the period length acquiring module;

the synchronization time acquiring module is further configured to query the update time for accessing the BCCH of each cell in the neighboring cell list in the time list, acquire update time for accessing a BCCH of a cell that is last added into the neighboring cell list, use a formula to acquire second synchronization time of the heartbeat behavior according to the update time for accessing the BCCH of the cell that is last added into the neighboring cell list, the heartbeat period, and the preset multiple; and the synchronization module is further configured to access BCCHs of all cells in the neighboring cell list by using the period length of the downlink heartbeat behavior as the period from the second synchronization time of the heartbeat behavior, wherein is an integer and is greater than or equal to 1.

20. The apparatus according to claim 19, wherein the period length acquiring module comprises:

a first period length acquiring unit, configured to use a formula to acquire a first period length according to the period length for accessing the BCCH of each cell in the neighboring cell list in the period list acquired by the list acquiring module and the preset multiple; and a period length acquiring unit, configured to, when the period length of the uplink heartbeat behavior set by the period length acquiring module is greater than or equal to the first period length acquired by the first period length acquiring unit, set the first period length as the period length of the downlink heartbeat behavior; and the period length acquiring unit is further configured to, when the period length of the uplink heartbeat behavior is less than the first period length, set the period length of the uplink heartbeat behavior as the period length of the downlink heartbeat behavior; wherein:

indicates a period length for accessing a BCCH of a 1st cell; indicates a period length for accessing a BCCH of an th cell; and is an integer and is greater than or equal to 1.

21. The apparatus according to claim 20, wherein the synchronization module is further configured to synchronously perform the location area update and the routing area update, and access the BCCHs of all cells in the neighboring cell list by using a period length of second heartbeat behavior as the period from third synchronization time;

when the first synchronization time is later than the second synchronization time, the third synchronization time is the first synchronization time; or when the second synchronization time is later than the first synchronization time, the third synchronization time is the second synchronization time; and the period length of the second heartbeat behavior is times the period length of the downlink heartbeat behavior, times the period length of the downlink heartbeat behavior is less than the period length of the uplink heartbeat behavior, times the period length of the downlink heartbeat behavior is greater than the period length of the uplink heartbeat behavior, and is an integer and is greater than or equal to 1.

22. The apparatus according to claim 17, wherein when the period list acquired by the list acquiring module comprises a period length for accessing a Broadcast Control Channel (BCCH) of each cell in a neighboring cell list, and the time list comprises update time for accessing the BCCH of each cell in the neighboring cell list, the period length acquiring module is specifically configured to use a formula to acquire a first period length according to the preset multiple and the period length for accessing the BCCH of each cell in the neighboring cell list in the period list acquired by the list acquiring module, and set the first period length as a period length of downlink heartbeat behavior;

the synchronization time acquiring module is specifically configured to query the update time for accessing the BCCH of each cell in the neighboring cell list in the time list acquired by the list acquiring module, acquire update time for accessing a BCCH of a cell that is last added into the neighboring cell list, use a formula to acquire second synchronization time of the heartbeat behavior according to the update time for accessing the BCCH of the cell that is last added into the neighboring cell list, the heartbeat period, and the preset multiple; and the synchronization module is specifically configured to access the BCCHs of all cells in the neighboring cell list by using the period length of the downlink heartbeat behavior set by the period length acquiring module as the period from the second synchronization time of the heartbeat behavior acquired by the synchronization time acquiring module; accessing the BCCHs of a cell in the neighboring cell list is a type of heartbeat behavior; wherein:

is an integer and is greater than or equal to 1; indicates a period length for accessing a BCCH of a 1st cell; indicates a period length for accessing a BCCH of an th cell; and is an integer and is greater than or equal to 1.

23. The apparatus according to claim 22, wherein when the period list acquired by the list acquiring module further comprises a period length of a periodic location area update and a period length of a periodic routing area update, the time list further comprises update time of the periodic location area update and update time of the periodic routing area update, the period length acquiring module is further configured to set the period length of the periodic location area update or the period length of the periodic routing area update acquired by the list acquiring module as a period length of uplink heartbeat behavior;

the synchronization time acquiring module is further configured to acquire first synchronization time of the heartbeat behavior according to the update time of the periodic location area update or the update time of the periodic routing area update in the time list, the heartbeat period, and the preset multiple; and the synchronization module is further configured to synchronously perform a location area update and a routing area update by using the period length of the uplink heartbeat behavior set by the period length acquiring module as the period from the first synchronization time of the heartbeat behavior.

24. The apparatus according to claim 23, wherein the synchronization time acquiring module is specifically configured to, when the update time of the routing area update is later than the update time of the location area update, use a formula to acquire the first synchronization time of the heartbeat behavior according to the update time of the periodic routing area update in the time list, the heartbeat period, and the preset multiple; and the synchronization time acquiring module is further specifically configured to, when the update time of the location area update is later than the update time of the routing area update, use a formula to acquire the first synchronization time of the heartbeat behavior according to the update time of the periodic location area update in the time list, the heartbeat period, and the preset multiple, wherein is an integer and is greater than or equal to 1.

25. The apparatus according to claim 24, wherein the period length acquiring module comprises:

a first period length acquiring unit, configured to use a formula to acquire a first period length according to the preset multiple and the period length for accessing the BCCH of each cell in the neighboring cell list in the period list acquired by the list acquiring module; and a period length acquiring unit, configured to, when the period length of the uplink heartbeat behavior set by the period length acquiring module is greater than or equal to the first period length acquired by the first period length acquiring unit, set the first period length as the period length of the downlink heartbeat behavior.

26. The apparatus for synchronizing the heartbeat behavior according to claim 25, wherein the period length acquiring unit is further configured to, when the period length of the uplink heartbeat behavior is less than the first period length, set the period length of the uplink heartbeat behavior as the period length of the downlink heartbeat behavior.

* * * * *